US012650731B2

(12) United States Patent
McCombe et al.

(10) Patent No.:    US 12,650,731 B2
(45) Date of Patent:         Jun. 9, 2026

(54) DISTRIBUTED FOVEATED RENDERING

(71) Applicant: Apple Inc., Cupertino, CA (US)

(72) Inventors: James A. McCombe, San Francisco, CA (US); Chad E. Jones, San Jose, CA (US); Christopher M. Garrido, Santa Clara, CA (US); Dan Miao, Fremont, CA (US); Dazhong Zhang, Saratoga, CA (US); Nathaniel C. Begeman, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 19/070,374

(22) Filed: Mar. 4, 2025

(65) Prior Publication Data

US 2025/0291413 A1      Sep. 18, 2025

Related U.S. Application Data

(60) Provisional application No. 63/708,487, filed on Oct. 17, 2024, provisional application No. 63/564,126, filed on Mar. 12, 2024.

(51) Int. Cl.
  *G06F 3/01*          (2006.01)
  *G06F 3/14*          (2006.01)
  *G06T 3/18*          (2024.01)
(52) U.S. Cl.
  CPC ............... *G06F 3/013* (2013.01); *G06F 3/14* (2013.01); *G06T 3/18* (2024.01)

(58) Field of Classification Search
  None
  See application file for complete search history.

(56) References Cited

U.S. PATENT DOCUMENTS

| | | | |
|---|---|---|---|
| 2021/0096644 A1 | 4/2021 | Wang et al. | |
| 2022/0269338 A1 | 8/2022 | O'Hern et al. | |
| 2024/0185380 A1* | 6/2024 | Wu | ........................... G06T 3/40 |
| 2024/0282059 A1* | 8/2024 | Kim | ..................... G02B 27/017 |

FOREIGN PATENT DOCUMENTS

| | | |
|---|---|---|
| WO | WO2019/217264 A1 | 11/2019 |
| WO | WO2023/018997 A1 | 2/2023 |

OTHER PUBLICATIONS

Extended European Search Report for corresponding European Appl. No. 25163148.7 dated Jul. 16, 2025 (7 pages).

* cited by examiner

*Primary Examiner* — Nicholas J Lee
(74) *Attorney, Agent, or Firm* — Fernando & Partners, LLP

(57)          ABSTRACT
In one implementation, a method of displaying a display image is performed by a first device having a first display, one or more processors, and non-transitory memory. The method includes obtaining gaze data indicative of a gaze of a user. The method includes transmitting, to a second device having a second display, warp parameters based on the gaze data. The method includes receiving, from the second device, display data based on the warp parameters. The method includes displaying, on the first display, a display image based on the display data.

20 Claims, 20 Drawing Sheets

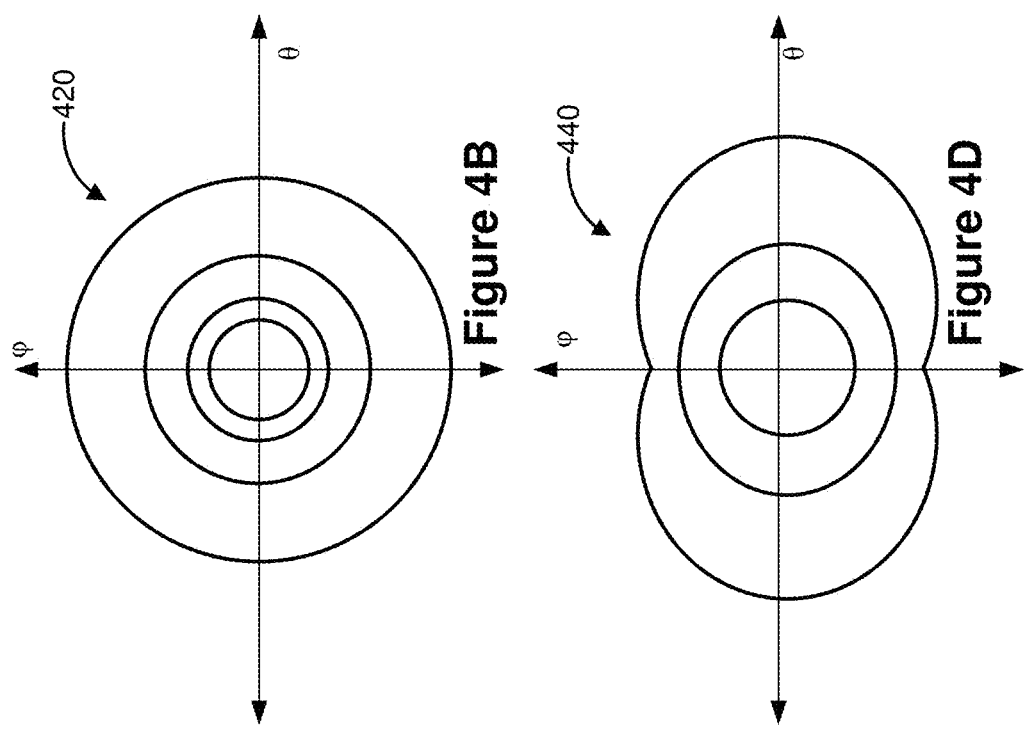
Figure 4B
Figure 4D
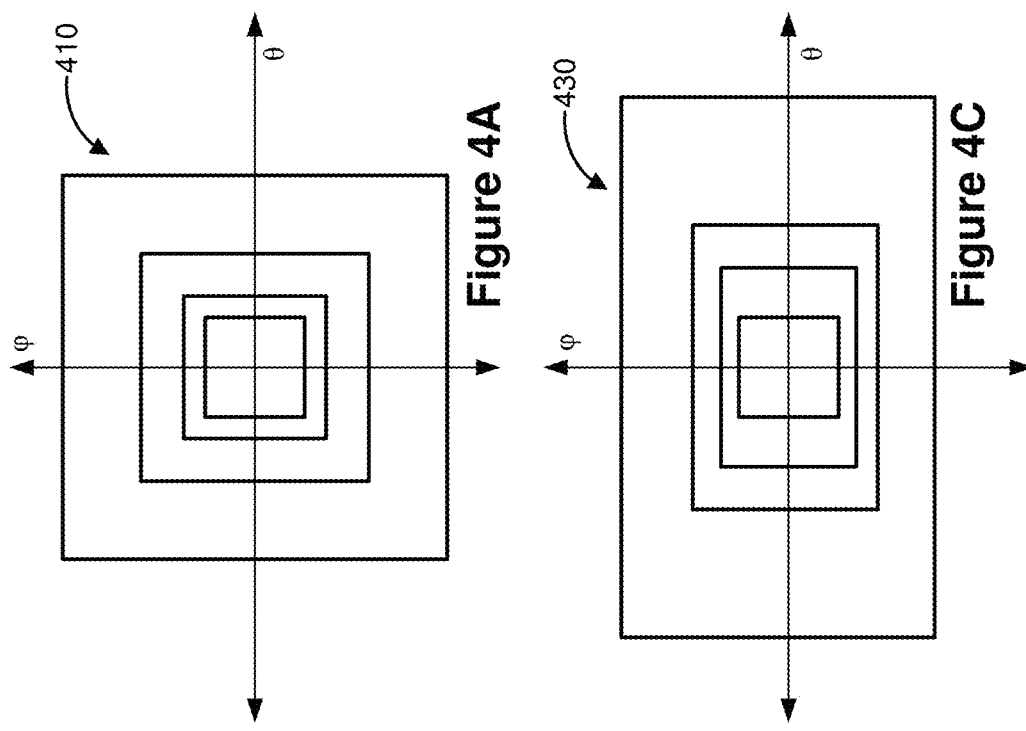
Figure 4A
Figure 4C

<u>700</u>

Obtain XR content to be rendered into a display space ⟋710

Obtain a resolution function defining a mapping between the display space and a rendered space ⟋720

Generate a rendered image based on the XR content and the rendering resolution function ⟋730

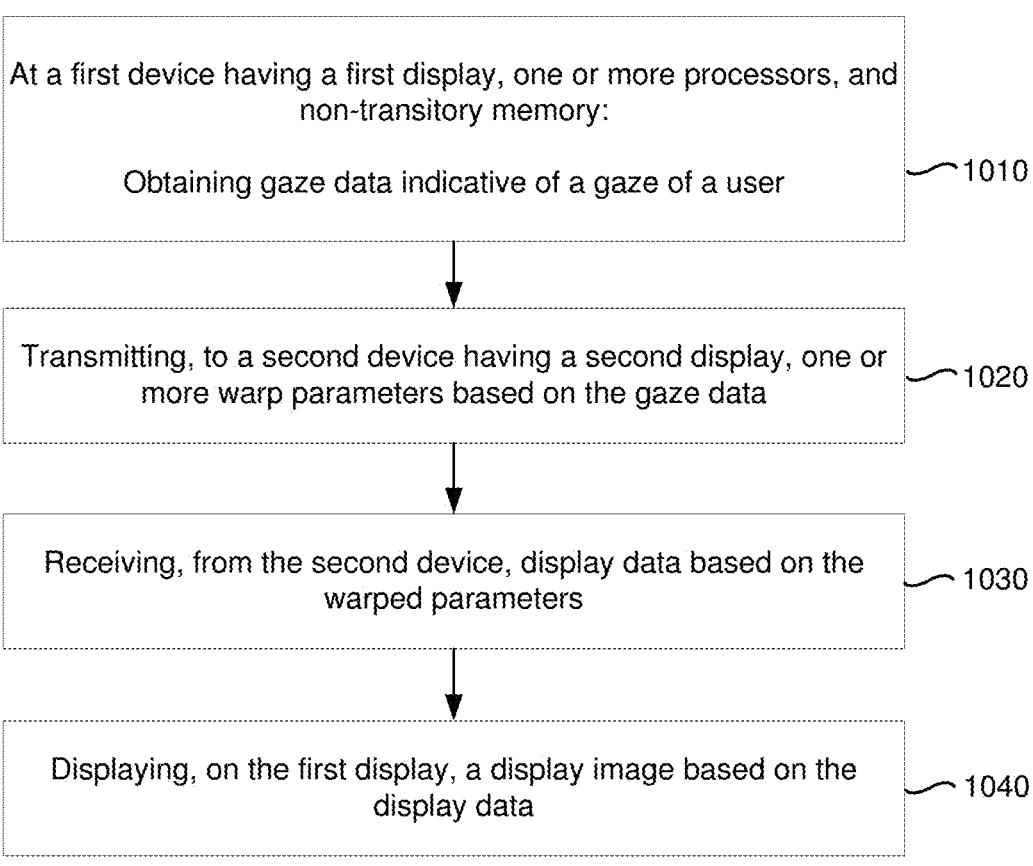

1000

At a first device having a first display, one or more processors, and non-transitory memory:

Obtaining gaze data indicative of a gaze of a user                    1010

Transmitting, to a second device having a second display, one or more warp parameters based on the gaze data                    1020

Receiving, from the second device, display data based on the warped parameters                    1030

Displaying, on the first display, a display image based on the display data                    1040

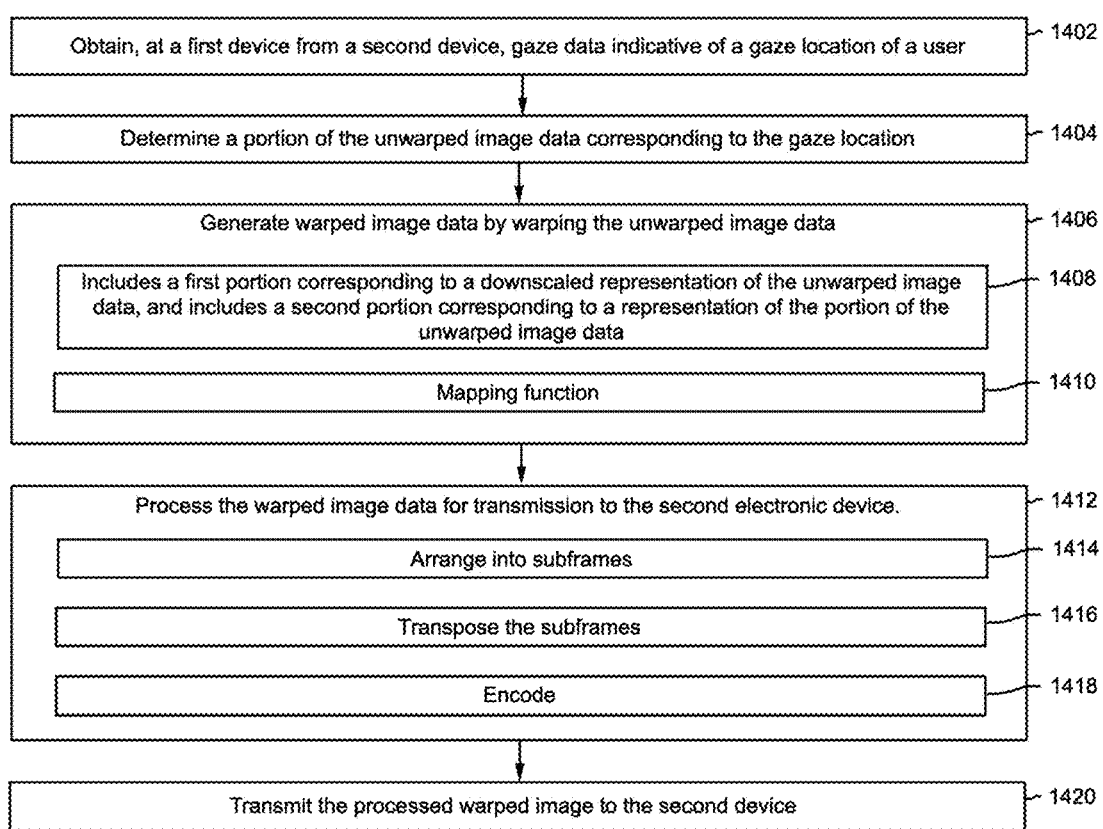

Obtain, at a first device from a second device, gaze data indicative of a gaze location of a user — 1402

Determine a portion of the unwarped image data corresponding to the gaze location — 1404

Generate warped image data by warping the unwarped image data — 1406

Includes a first portion corresponding to a downscaled representation of the unwarped image data, and includes a second portion corresponding to a representation of the portion of the unwarped image data — 1408

Mapping function — 1410

Process the warped image data for transmission to the second electronic device. — 1412

Arrange into subframes — 1414

Transpose the subframes — 1416

Encode — 1418

Transmit the processed warped image to the second device — 1420

Obtain gaze data that is indicative of a gaze location of a user — 1502

Transmit the gaze data to a second device — 1504

Receive, from the second device, processed warped image data that is based on the gaze data — 1506

Generate a display image based on the processed warped image data — 1508

Decode the warped image data — 1510

Display the display image. — 1512

DISTRIBUTED FOVEATED RENDERING

CROSS-REFERENCE TO RELATED APPLICATIONS

This application claims priority to U.S. Provisional Patent App. No. 63/564,126, filed on Mar. 12, 2024, and U.S. Provisional Patent App. No. 63/708,487, filed on Oct. 17, 2024, which are both hereby incorporated by reference in their entirety.

TECHNICAL FIELD

The present disclosure generally relates to systems, methods, and devices for rendering content on multiple devices based on gaze.

BACKGROUND

In various implementations, a head-mounted device (HMD) captures an image of a physical environment and displays an XR environment based on a processed version of the captured image. In various implementations, content displayed by another device in the physical environment, such as a laptop, may be distorted by processing of the captured image.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4D illustrate various two-dimensional resolution functions in accordance with various implementations.

FIG. 10A is a flowchart representation of a method of displaying a display image in accordance with some implementations.

FIG. 14 is a flowchart representation of a method of generating warped image data based on gaze data in accordance with some implementations.

Figure 1:
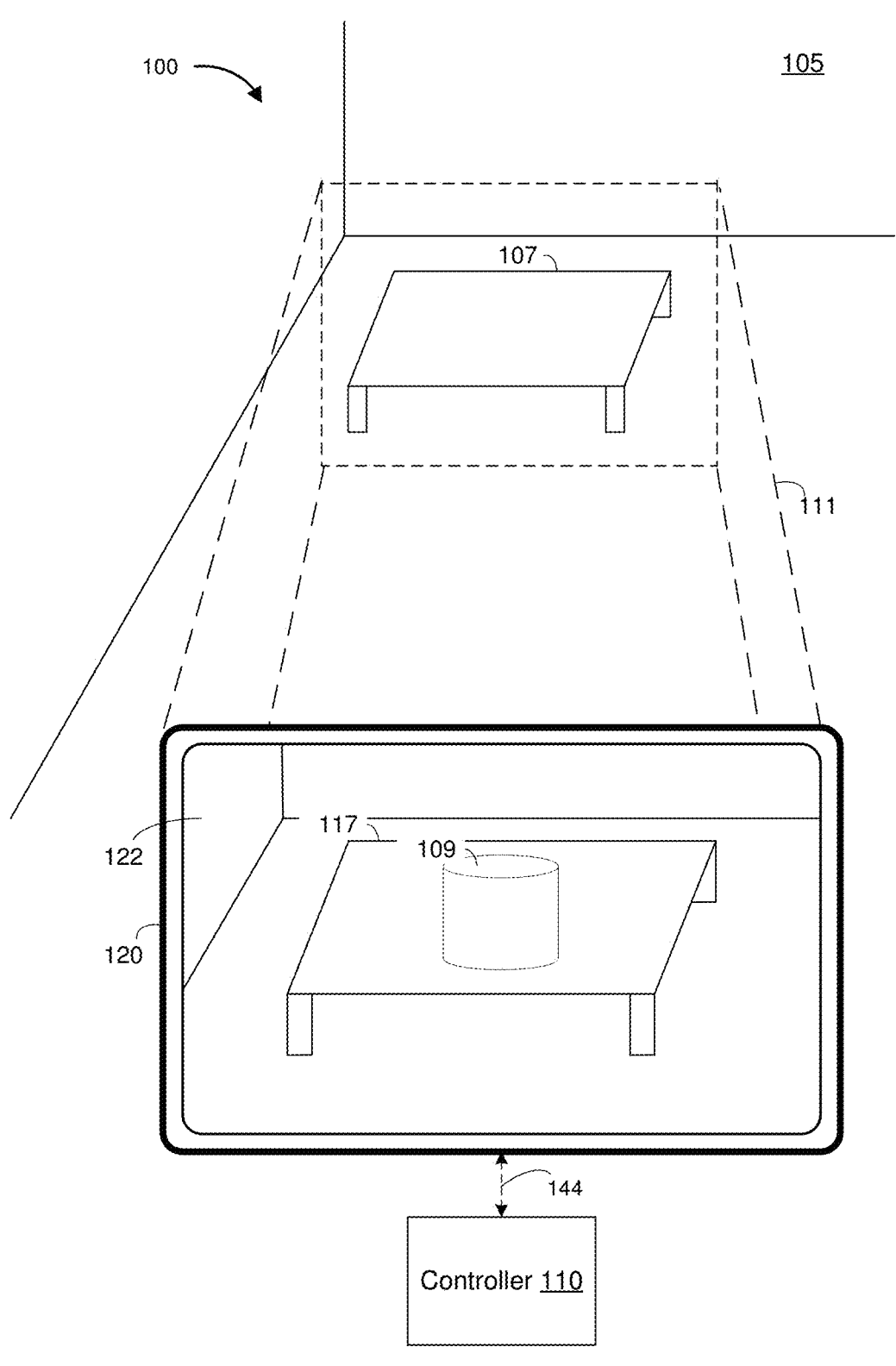
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and a method for displaying a display image. In various implementations, the method is performed by a first device having a first display, one or more processors, and non-transitory memory. The method includes obtaining gaze data indicative of a gaze of a user. The method includes transmitting, to a second device having a second display, warp parameters based on the gaze data. The method includes receiving, from the second device, display data based on the warp parameters. The method includes displaying, on the first display, a display image based on the display data.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, in various implementations, a head-mounted device (HMD) captures an image of a physical environment and displays an XR environment based on a processed version of the captured image. Content displayed by another device in the physical environment, such as a laptop, may be distorted by processing of the captured image. For example, the captured image may be processed for point-of-view correction, color correction, lens distortion correction, etc. Accordingly, in various implementations, content which would be displayed by the other device is directly transmitted to the HMD, e.g. via a wireless connection or a wired connection. The HMD then displays the content at an appropriate location.

However, in various circumstances, the amount of data that can be transmitted from the other device to the HMD is rate-limited. For example, in various implementations, the other device has an encoder that can only generate a fixed number of pixel values per second. As another example, in various implementations, a bandwidth between the other device and the HMD may be limited. Accordingly, in various implementations, the other device transmits foveated display data based on gaze information received from the HMD.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 11. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 12.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
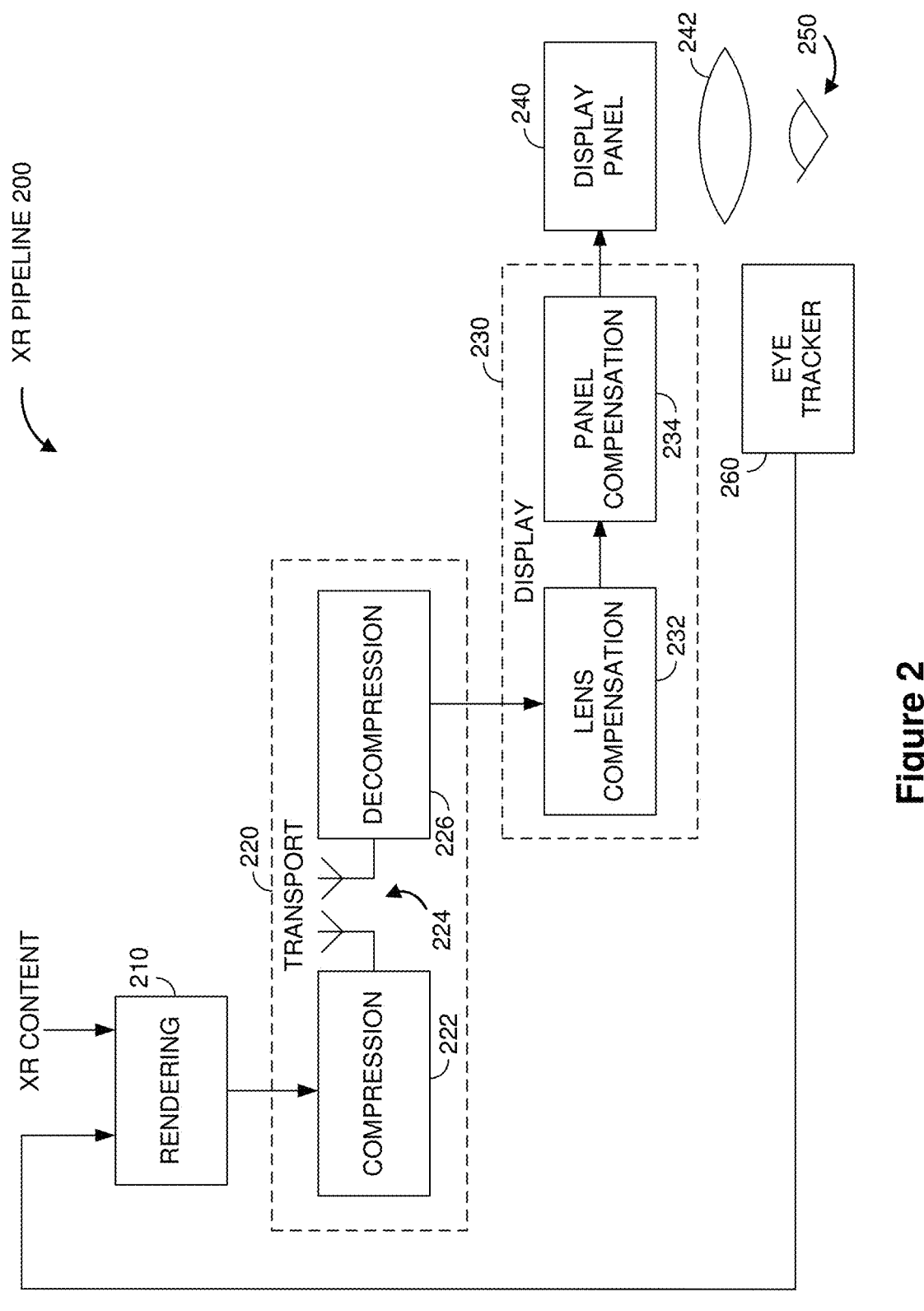
FIG. 2 illustrates an XR pipeline that receives XR content and displays an image on a display panel based on the XR content in accordance with some implementations.

In various implementations, the electronic device 120 includes an XR pipeline that presents the XR content. FIG. 2 illustrates an XR pipeline 200 that receives XR content and displays an image on a display panel 240 based on the XR content.

The XR pipeline 200 includes a rendering module 210 that receives the XR content (and eye tracking data from an eye tracker 260) and renders an image based on the XR content. In various implementations, XR content includes definitions of geometric shapes of virtual objects, colors and/or textures of virtual objects, images (such as a pass-through image of the physical environment), and other information describing content to be represented in the rendered image.

An image includes a matrix of pixels, each pixel having a corresponding pixel value and a corresponding pixel location. In various implementations, the pixel values range from 0 to 255. In various implementations, each pixel value is a color triplet including three values corresponding to three color channels. For example, in one implementation, an image is an RGB image and each pixel value includes a red value, a green value, and a blue value. As another example, in one implementation, an image is a YUV image and each pixel value includes a luminance value and two chroma values. In various implementations, the image is a YUV444 image in which each chroma value is associated with one pixel. In various implementations, the image is a YUV420 image in which each chroma value is associated with a 2×2 block of pixels (e.g., the chroma values are downsampled). In some implementations, an image includes a matrix of tiles, each tile having a corresponding tile location and including a block of pixels with corresponding pixel values. In some implementations, each tile is a 32×32 block of pixels. While specific pixel values, image formats, and tile sizes are provided, it should be appreciated that other values, formats, and tile sizes may be used.

The image rendered by the rendering module 210 (e.g., the rendered image) is provided to a transport module 220 that couples the rendering module 210 to a display module 230. The transport module 220 includes a compression module 222 that compresses the rendered image (resulting in a compressed image), a communications channel 224 that carries the compressed image, and a decompression module 226 that decompresses the compressed image (resulting in a decompressed image).

The decompressed image is provided to a display module 230 that converts the decompressed image into panel data. The panel data is provided to a display panel 240 that displays a displayed image as described by (e.g., according to) the panel data. The display module 230 includes a lens compensation module 232 that compensates for distortion caused by an eyepiece 242 of the electronic device 120. For example, in various implementations, the lens compensation module 232 pre-distorts the decompressed image in an inverse relationship to the distortion caused by the eyepiece 242 such that the displayed image, when viewed through the eyepiece 242 by a user 250, appears undistorted. The display module 230 also includes a panel compensation module 234 that converts image data into panel data to be read by the display panel 240.

The display panel 240 includes a matrix of MxN pixels located at respective locations in a display space. The display panel 240 displays the displayed image by emitting light from each of the pixels as described by (e.g., according to) the panel data.

In various implementations, the XR pipeline 200 includes an eye tracker 260 that generates eye tracking data indicative of a gaze of the user 250. In various implementations, the eye tracking data includes data indicative of a fixation point of the user 250 on the display panel 240. In various implementations, the eye tracking data includes data indicative of a gaze angle of the user 250, such as the angle between the current optical axis of the user 250 and the optical axis when the user 250 is looking at the center of the display panel 240.

In various implementations, in order to render an image for display on the display panel 240, the rendering module 210 generates MxN pixel values for each pixel of an MxN image. Thus, each pixel of the rendered image corresponds to a pixel of the display panel 240 with a corresponding location in the display space. Thus, the rendering module 210 generates a pixel value for MxN pixel locations uniformly spaced in a grid pattern in the display space.

Rendering MxN pixel values can be computationally expensive. Further, as the size of the rendered image increases, so does the amount of processing needed to compress the image at the compression module 222, the amount of bandwidth needed to transport the compressed image across the communications channel 224, and the amount of processing needed to decompress the compressed image at the decompression module 226.

In various implementations, in order to decrease the size of the rendered image without degrading the user experience, foveation (e.g., foveated imaging) is used. Foveation is a digital image processing technique in which the image resolution, or amount of detail, varies across an image. Thus, a foveated image has different resolutions at different parts of the image. Humans typically have relatively weak peripheral vision. According to one model, resolvable resolution for a user is maximum over a fovea (e.g., an area where the user is gazing) and falls off in an inverse linear fashion.

Accordingly, in one implementation, the displayed image displayed by the display panel 240 is a foveated image having a maximum resolution at a fovea and a resolution that decreases in an inverse linear fashion in proportion to the distance from the fovea.

Because some portions of the image have a lower resolution, an MxN foveated image includes less information than an MxN unfoveated image. Thus, in various implementations, the rendering module 210 generates, as a rendered image, a foveated image. The rendering module 210 can generate an MxN foveated image more quickly and with less processing power (and battery power) than the rendering module 210 can generate an MxN unfoveated image. Also, an MxN foveated image can be expressed with less data than an MxN unfoveated image. In other words, an MxN foveated image file is smaller in size than an MxN unfoveated image file. In various implementations, compressing an MxN foveated image using various compression techniques results in fewer bits than compressing an MxN unfoveated image.

A foveation ratio, R, can be defined as the amount of information in the MxN unfoveated image divided by the amount of information in the MxN foveated image. In various implementations, the foveation ratio is between 1.5 and 10. For example, in some implementations, the foveation ratio is 2. In some implementations, the foveation ratio is 3 or 4. In some implementations, the foveation ratio is constant among images. In some implementations, the foveation ratio is determined for the image being rendered. For example, in various implementations, the amount of information the XR pipeline 200 is able to throughput within a particular time period, e.g., a frame period of the image, may be limited. For example, in various implementations, the amount of information the rendering module 210 is able to render in a frame period may decrease due to a thermal event (e.g., when processing to compute additional pixel values would cause a processor to overheat). As another example, in various implementations, the amount of information the transport module 220 is able to transport in a frame period may decrease due to a decrease in the signal-to-noise ratio of the communications channel 224.

In some implementations, in order to render an image for display on the display panel 240, the rendering module 210 generates M/RxN/R pixel values for each pixel of an M/RxN/R warped image. At least some pixels of the warped image correspond to an area greater than a pixel of the display panel 240 at a corresponding location in the display space. Thus, the rendering module 210 generates a pixel value for each of M/RxN/R locations in the display space that are not uniformly distributed in a grid pattern. The respective area in the display space corresponding to each pixel value is defined by the corresponding location in the display space (a rendering location) and a scaling factor (or a set of a horizontal scaling factor and a vertical scaling factor).

In various implementations, the rendering module 210 generates, as a rendered image, a warped image. In various implementations, the warped image includes a matrix of M/RxN/R pixel values for M/RxN/R locations uniformly spaced in a grid pattern in a warped space that is different than the display space. Particularly, the warped image includes a matrix of M/RxN/R pixel values for M/RxN/R locations in the display space that are not uniformly distributed in a grid pattern. Thus, whereas the resolution of the warped image is uniform in the warped space, the resolution varies in the display space. This is described in greater detail below with respect to FIGS. 8A and 8B.

The rendering module 210 determines the rendering locations and the corresponding scaling factors based on a resolution function that generally characterizes the resolution of the rendered image in the displayed space.

In one implementation, the resolution function, S(x), is a function of a distance from an origin of the display space (which may correspond to the center of the display panel 240). In another implementation, the resolution function, S(θ), is a function of an angle between an optical axis of the user 250 and the optical axis when the user 250 is looking at the center of the display panel 240. Thus, in one implementation, the resolution function, S(θ), is expressed in pixels per degree (PPD).

Humans typically have relatively weak peripheral vision. According to one model, resolvable resolution for a user is maximum over a fovea and falls off in an inverse linear fashion as the angle increases from the optical axis. Accordingly, in one implementation, the resolution function (in a first dimension) is defined as:

$$S(\theta) = \begin{cases} S_{max} & \text{for } |\theta| < \theta_f \\ S_{min} + \dfrac{S_{max} - S_{min}}{1 + w(|\theta - \theta_f|)} & \text{for } |\theta| \ge \theta_f \end{cases},$$

where $S_{max}$ is the maximum of the resolution function (e.g., approximately 60 PPD), $S_{min}$ is the asymptote of the resolution function, $\theta_f$ characterizes the size of the fovea, and w characterizes a width of the resolution function or how quickly the resolution function falls off outside the fovea as the angle increases from the optical axis.

Figure 3A:
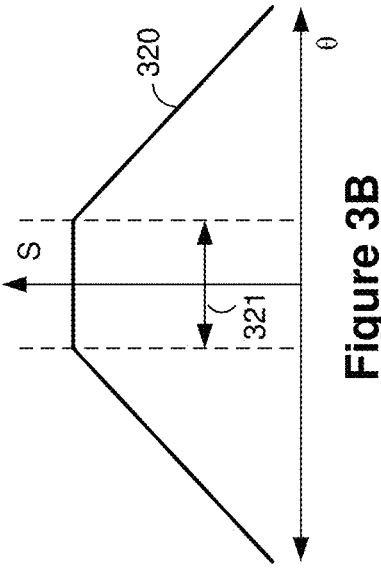
FIGS. 3A-3D illustrate various resolution functions in a first dimension in accordance with various implementations.
Figure 3B:
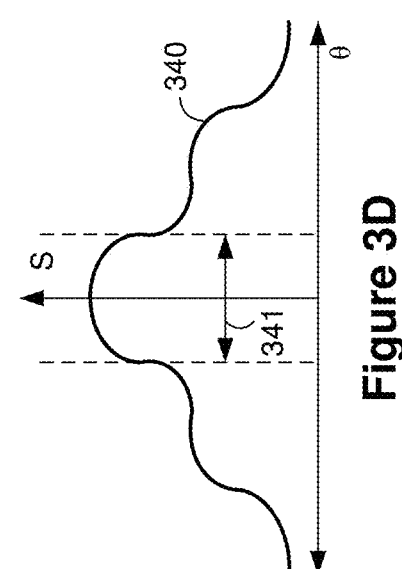
Figure 3C:
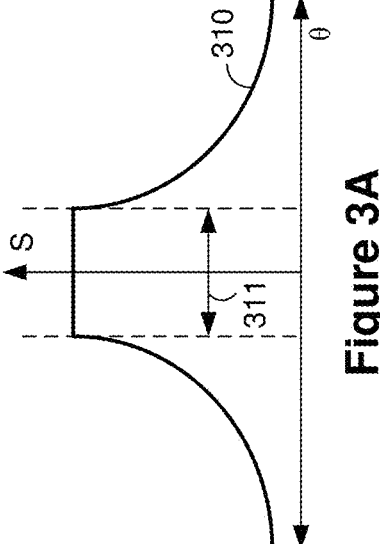
Figure 3D:
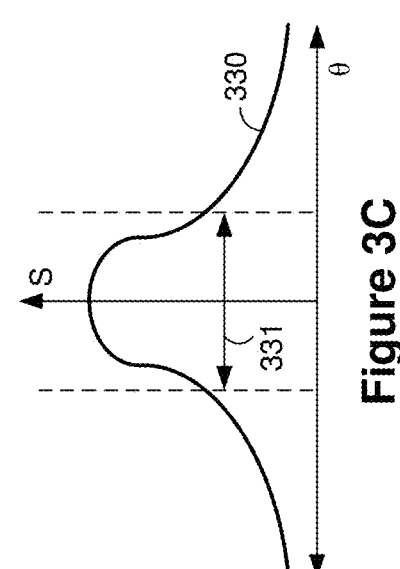

FIG. 3A illustrates a resolution function 310 (in a first dimension) which falls off in an inverse linear fashion from a fovea. FIG. 3B illustrates a resolution function 320 (in a first dimension) which falls off in a linear fashion from a fovea. FIG. 3C illustrates a resolution function 330 (in a first dimension) which is approximately Gaussian. FIG. 3D illustrates a resolution function 340 (in a first dimension) which falls off in a rounded stepwise fashion.

Each of the resolutions functions 310-340 of FIGS. 3A-3D is in the form of a peak including a peak height (e.g., a maximum value) and a peak width. The peak width can be defined in a number of ways. In one implementation, the peak width is defined as the size of the fovea (as illustrated by width 311 of FIG. 3A and width 321 of FIG. 3B). In one implementation, the peak width is defined as the full width at half maximum (as illustrated by width 331 of FIG. 3C). In one implementation, the peak width is defined as the distance between the two inflection points nearest the origin (as illustrated by width 341 of FIG. 3D). In various implementations, the number of pixels in a rendered image is proportional to the integral of the resolution function over the field-of-view. Thus, a summation value is defined as the area under the resolution function over the field-of-view.

Whereas FIGS. 3A-3D illustrate resolution functions in a single dimension, it is to be appreciated that the resolution function used by the rendering module 210 can be a two-dimensional function. FIG. 4A illustrates a two-dimensional resolution function 410 in which the resolution function 410 is independent in a horizontal dimension (θ) and a vertical dimension (φ) FIG. 4B illustrates a two-dimensional resolution function 420 in which the resolution function 420 is a function of single variable (e.g., $D=\sqrt{\theta^2+\varphi^2}$). FIG. 4C illustrates a two-dimensional resolution function 430 in which the resolution function 430 is different in a horizontal dimension (θ) and a vertical dimension (φ). FIG. 4D illustrates a two-dimensional resolution function 440 based on a human vision model.

As described in detail below, the rendering module 210 generates the resolution function based on a number of factors, including biological information regarding human vision, eye tracking data, eye tracking metadata, the XR content, and various constraints (such as constraints imposed by the hardware of the electronic device 120).

Figure 5A:
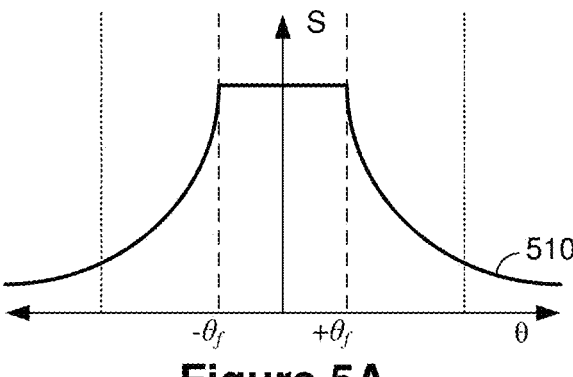
FIG. 5A illustrates an example resolution function that characterizes a resolution in a display space as a function of angle in a warped space in accordance with some implementations.

FIG. 5A illustrates an example resolution function 510, denoted S(θ), which characterizes a resolution in the display space as a function of angle in the warped space. The resolution function 510 is a constant (e.g., $S_{max}$) within a fovea (between $-\theta_f$ and $+\theta_f$) and falls off in an inverse linear fashion outside this window.

Figure 5B:
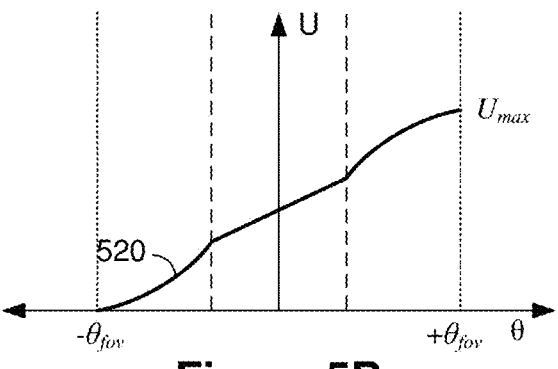
FIG. 5B illustrates the integral of the example resolution function of FIG. 5A in accordance with some implementations.

FIG. 5B illustrates the integral 520, denoted U(θ), of the resolution function 510 of FIG. 5A within a field-of-view, e.g., from $-\theta_{fov}$ to $+\theta_{fov}$. Thus, $$U(\theta) = \int_{-\theta_{fov}}^{\theta} S(\breve{\theta})d\breve{\theta}.$$

The integral 520 ranges from 0 at $-\theta_{fov}$ to a maximum value, denoted $U_{max}$, at $+\theta_{fov}$.

Figure 5C:
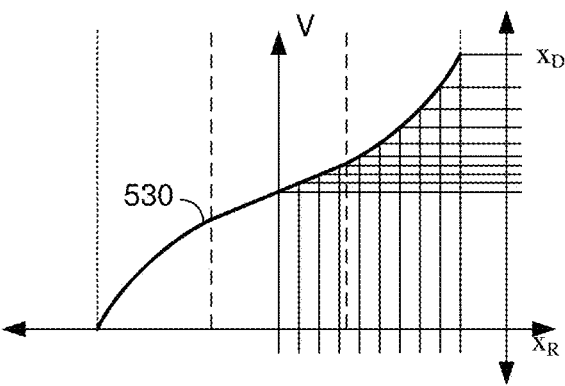
FIG. 5C illustrates the tangent of the inverse of the integral of the example resolution function of FIG. 5A in accordance with some implementations.

FIG. 5C illustrates the tangent 530, denoted $V(x_R)$, of the inverse of the integral 520 of the resolution function 510 of FIG. 5A. Thus, $V(x_R)=\tan(U^{-1}(x_R))$. The tangent 530 illustrates a direct mapping from rendered space, in XR, to display space, in $x_D$. According to the foveation indicated by the resolution function 510, the uniform sampling points in the warped space (equally spaced along the $x_R$ axis) correspond to non-uniform sampling points in the display space (non-equally spaced along the $x_D$ axis). Scaling factors can be determined by the distances between the non-uniform sampling points in the display space.

When performing static foveation, the rendering module 210 uses a resolution function that does not depend on the gaze on the user. However, when performing dynamic foveation, the rendering module 210 uses a resolution function that depends on the gaze of the user. In particular, when performing dynamic foveation, the rendering module 210 uses a resolution function that has a peak height at a location corresponding to a location in the display space at which the user is looking (e.g., a gaze point of the user as determined by the eye tracker 260).

Figure 6B:
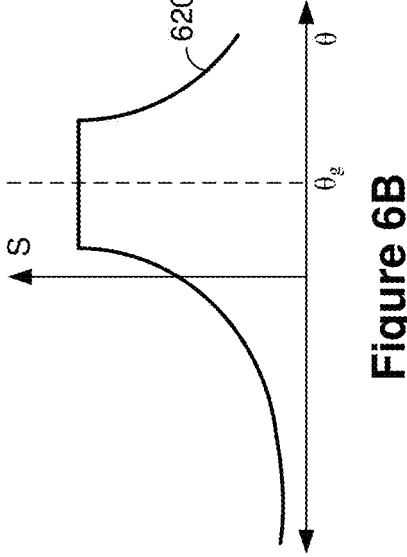
FIG. 6B illustrates an example resolution function for performing dynamic foveation in accordance with some implementations.
Figure 6A:
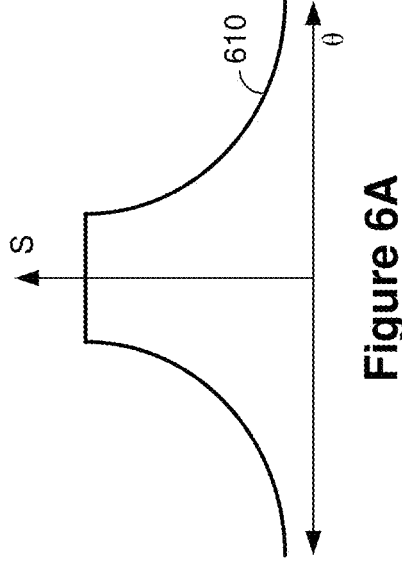
FIG. 6A illustrates an example resolution function for performing static foveation in accordance with some implementations.

FIG. 6A illustrates a resolution function 610 that may be used by the rendering module 210 when performing static foveation. The rendering module 210 may also use the resolution function 610 of FIG. 6A when performing dynamic foveation and the user is looking at the center of the display panel 240. FIG. 6B illustrates a resolution function 620 that may be used by the rendering module 210 when performing dynamic foveation and the user is looking at a gaze angle ($\theta_g$) away from the center of the display panel 240.

Accordingly, in one implementation, the resolution function (in a first dimension) is defined as:

$$S(\theta) = \begin{cases} S_{max} & \text{for } |\theta - \theta_g| < \theta_f \\ S_{min} + \dfrac{S_{max} - S_{min}}{1 + w(|\theta - \theta_g - \theta_f|)} & \text{for } |\theta - \theta_g| \ge \theta_f \end{cases}.$$

Figure 7:
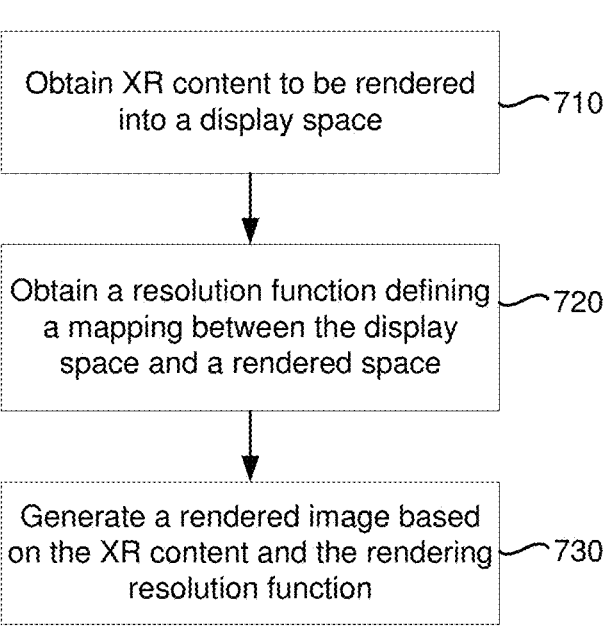
FIG. 7 is a flowchart representation of a method of rendering an image based on a resolution function in accordance with some implementations.

FIG. 7 is a flowchart representation of a method 700 of rendering an image in accordance with some implementations. In some implementations (and as detailed below as an example), the method 700 is performed by a rendering module, such as the rendering module 210 of FIG. 2. In various implementations, the method 700 is performed by an electronic device, such as the electronic device 120 of FIG. 1, or a portion thereof, such as the XR pipeline 200 of FIG. 2. In various implementations, the method 700 is performed by a device with one or more processors, non-transitory memory, and one or more XR displays. In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, at block 710, with the rendering module obtaining XR content to be rendered into a display space. In various implementations, XR content can include definitions of geometric shapes of virtual objects, colors and/or textures of virtual objects, images (such as a pass-through image of the physical environment), or other information describing content to be represented in the rendered image.

The method 700 continues, at block 720, with the rendering module obtaining a resolution function defining a mapping between the display space and a warped space. Various resolution functions are illustrated in FIGS. 3A-3D and FIGS. 4A-4D. Various methods of generating a resolution function are described further below.

In various implementations, the resolution function generally characterizes the resolution of the rendered image in the display space. Thus, the integral of the resolution function provides a mapping between the display space and the warped space (as illustrated in FIGS. 5A-5C). In one implementation, the resolution function, S (x), is a function of a distance from an origin of the display space. In another implementation, the resolution function, S($\theta$), is a function of an angle between an optical axis of the user and the optical axis when the user is looking at the center of the display panel. Accordingly, the resolution function characterizes a resolution in the display space as a function of angle (in the display space). Thus, in one implementation, the resolution function, S($\theta$), is expressed in pixels per degree (PPD).

In various implementations, the rendering module performs dynamic foveation and the resolution function depends on the gaze of the user. Accordingly, in some implementations, obtaining the resolution function includes obtaining eye tracking data indicative of a gaze of a user, e.g., from the eye tracker 260 of FIG. 2, and generating the resolution function based on the eye tracking data. In various implementations, the eye tracking data includes at least one of a data indicative of a gaze angle of the user or data indicative of a gaze point of the user. In particular, in various implementations, generating the resolution function based on the eye tracking data includes generating a resolution function having a peak height at a location the user is looking at as indicated by the eye tracking data.

The method 700 continues, at block 730, with the rendering module generating a rendered image based on the XR content and the resolution function. The rendered image includes a warped image with a plurality of pixels at respective locations uniformly spaced in a grid pattern in the warped space. The plurality of pixels is respectively associated with a plurality of respective pixel values based on the XR content. The plurality of pixels is respectively associated with a plurality of respective scaling factors defining an area in the display space based on the resolution function. Thus, each pixel is associated with a pixel value and a scaling factor (which may be a two-dimensional vector including a horizontal scaling factor and a vertical scaling factor). The plurality of respective scaling factors can be represented as a scaling factor matrix having the same dimensions as the rendered image.

An image that is said to be in a display space has uniformly spaced regions (e.g., pixels or groups of pixels) that map to uniformly spaced regions (e.g., pixels or groups of pixels) of a display. An image that is said to be in a warped space has uniformly spaced regions (e.g., pixels or groups of pixels) that map to non-uniformly spaced regions (e.g., pixels or groups of pixels) in the display space. The relationship between uniformly spaced regions in the warped space to non-uniformly spaced regions in the display space is defined at least in part by the scaling factors. Thus, the plurality of respective scaling factors (like the resolution function) defines a mapping between the warped space and the display space.

In various implementations, the rendering module transmits the warped image including the plurality of pixel values in association with the plurality of respective scaling factors. Accordingly, the warped image and the scaling factors, rather than a foveated image which could be generated using this information, is propagated through the XR pipeline 200.

In particular, with respect to FIG. 2, in various implementations, the rendering module 210 generates a warped image and a plurality of respective scaling factors that are transmitted by the rendering module 210. At various stages in the XR pipeline 200, the warped image (or a processed version of the warped image) and the plurality of respective scaling factors are received (and used in processing the warped image) by the transport module 220 (and the compression module 222 and decompression module 226 thereof). At various stages in the XR pipeline 200, the warped image (or a processed version of the warped image) and the plurality of respective scaling factors are received (and used in processing the warped image) by the display module 230 (and the lens compensation module 232 and the panel compensation module 234 thereof).

In various implementations, the rendering module 210 generates the scaling factors based on the resolution function. For example, in some implementations, the scaling factors are generated based on the resolution function as described above with respect to FIGS. 5A-5C. In various implementations, generating the scaling factors includes determining the integral of the resolution function. In various implementations, generating the scaling factors includes determining the tangent of the inverse of the integral of the resolution function. In various implementations, generating the scaling factors includes, determining, for each of the respective locations uniformly spaced in a grid pattern in the warped space, the respective scaling factors based on the tangent of the inverse of the integral of the resolution function. Accordingly, for a plurality of locations uniformly spaced in the warped space, a plurality of locations non-uniformly spaced in the display space are represented by the scaling factors.

Figure 8B:
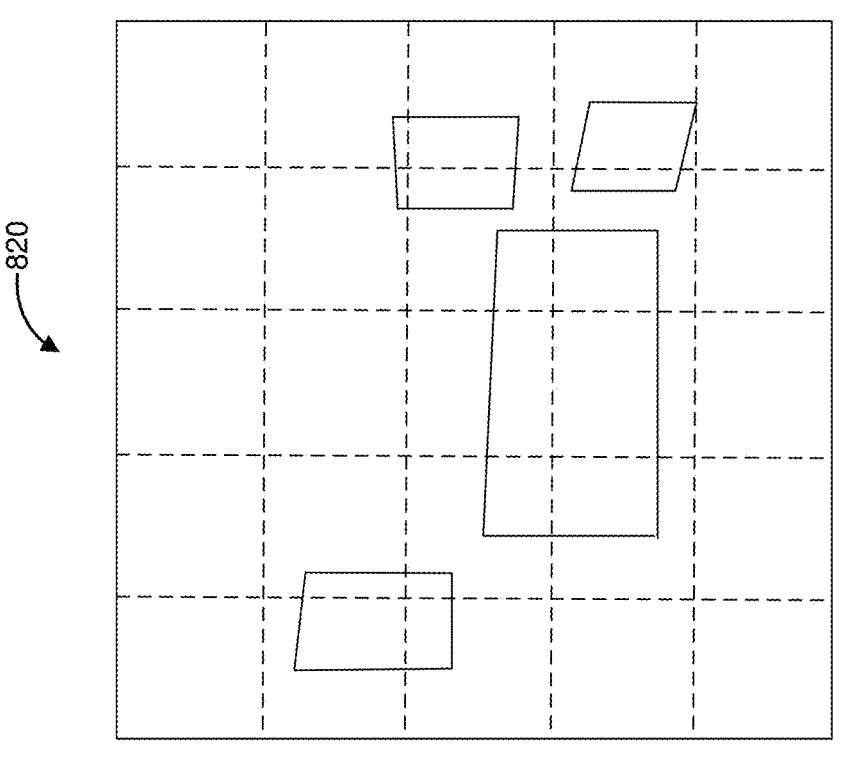
FIG. 8B illustrates a warped image of the XR content of FIG. 8A in accordance with some implementations.
Figure 8A:
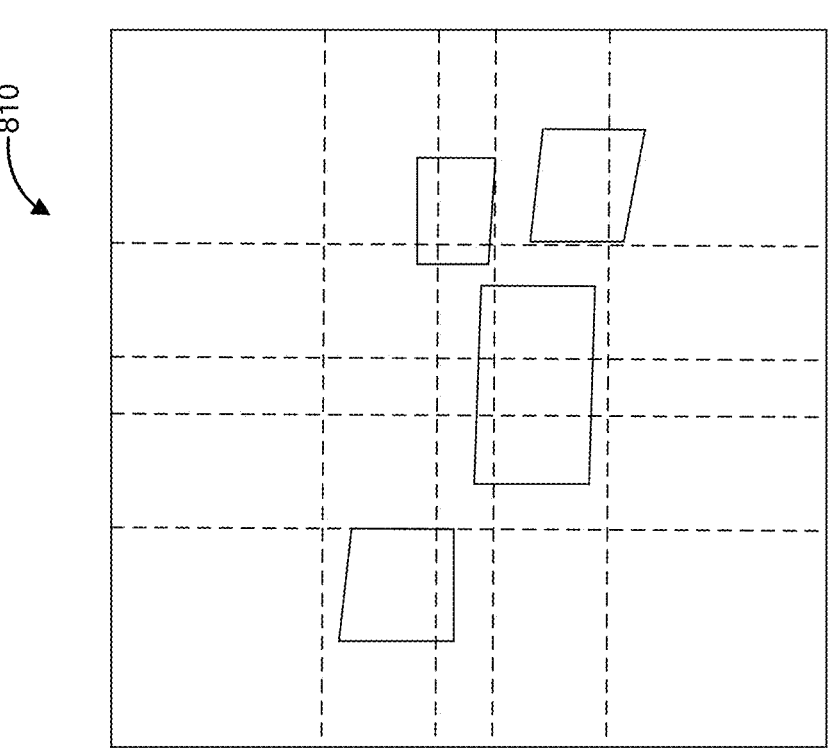
FIG. 8A illustrates an example image representation, in a display space, of XR content to be rendered in accordance with some implementations.

FIG. 8A illustrates an image representation of XR content 810 to be rendered in a display space. FIG. 8B illustrates a warped image 820 generated according to the method 700 of FIG. 7. In accordance with a resolution function, different parts of the XR content 810 corresponding to non-uniformly spaced regions (e.g., different amounts of area) in the display space are rendered into uniformly spaced regions (e.g., the same amount of area) in the warped image 820.

For example, the area at the center of the image representation of XR content 810 of FIG. 8A is represented by an area in the warped image 820 of FIG. 8B including K pixels (and K pixel values). Similarly, the area on the corner of the image representation of XR content 810 of FIG. 8A (a larger area than the area at the center of FIG. 8A) is also represented by an area in the warped image 820 of FIG. 8B including K pixels (and K pixel values).

Figure 9A:
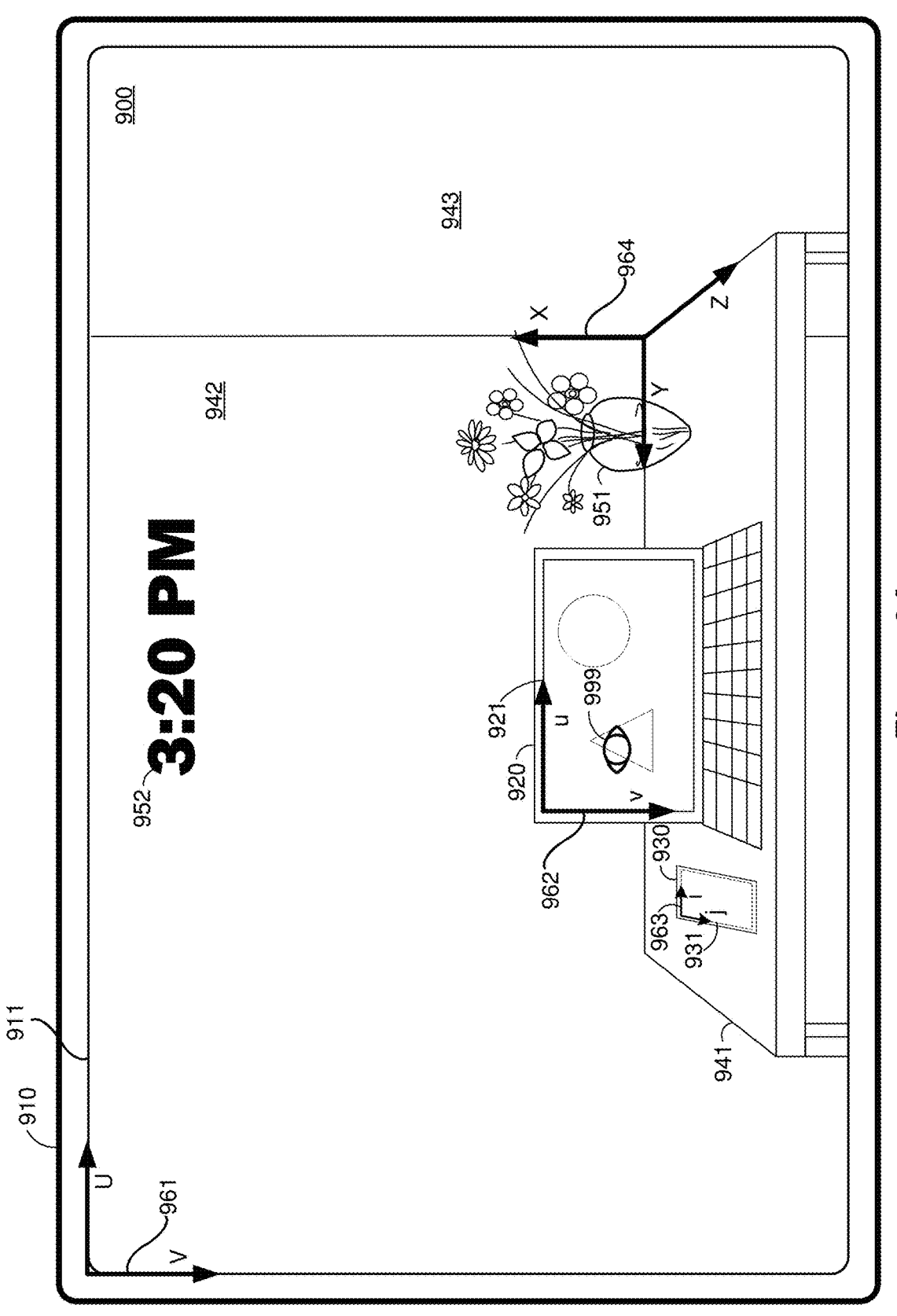
FIGS. 9A-9C illustrate an XR environment in accordance with some implementations.

FIG. 9A illustrates an XR environment 900 at a first time presented, at least in part, by a display 911 of an electronic device 910, such as the electronic device 120 of FIG. 1. The XR environment 900 is based on a physical environment of an office in which the electronic device 910 is present. In various implementations, the electronic device 910 is a head-mounted device (HMD) or a tablet.

FIG. 9A illustrates a gaze location indicator 999 that indicates a gaze location of the user, e.g., where in the XR environment 900 (or where on the display 911) the user is looking. Although the gaze location indicator 999 is illustrated in FIG. 9A, in various implementations, the gaze location indicator 999 is not displayed by the electronic device 910.

The XR environment 900 includes a plurality of objects, including one or more physical objects (e.g., a table 941 positioned in the corner between a back wall 942 and a side wall 943, a laptop 920 having a laptop display 921 on the table 941, and a smartphone 930 having a smartphone display 931 on the table 941 next to the laptop 920) of the physical environment and one or more virtual objects (e.g., virtual flowers 951 and a virtual clock 952). In various implementations, certain objects (such as the physical objects and the virtual flowers 951) are presented at a location in the XR environment 900, e.g., at a location defined by three coordinates in a three-dimensional (3D) XR coordinate system such that while some objects may exist in the physical world and the others may not, a spatial relationship (e.g., distance or orientation) may be defined between them. Accordingly, when the electronic device 910 moves in the XR environment 900 (e.g., changes either position and/or orientation), the objects are moved on the display 911 of the electronic device 910, but retain their location in the XR environment 900. Such virtual objects that, in response to motion of the electronic device 910, move on the display 911, but retain their position in the XR environment 900 are referred to as world-locked objects.

In various implementations, certain virtual objects (such as the virtual clock 952) are displayed at locations on the display 911 such that when the electronic device 910 moves in the XR environment 900, the objects are stationary on the display 911 on the electronic device 910. Such virtual objects that, in response to motion of the electronic device 910, retain their location on the display 911 are referred to as display-locked objects.

The XR environment 900 is associated with a three-dimensional XR coordinate system (represented by the axes 964) in which a point in the XR environment is described by an X-coordinate, a Y-coordinate, and a Z-coordinate. The display 911 of the electronic device 910 is associated with a two-dimensional device coordinate system (represented by the axes 961) in which a point on the display 911 is described by a U-coordinate and a V-coordinate. Similarly, the laptop display 921 is associated with a two-dimensional laptop coordinate system (represented by the axes 962) in which a point on the laptop display 921 is described by a u-coordinate and a v-coordinate. Further, the smartphone display 931 is associated with a two-dimensional smartphone coordinate system (represented by the axes 963) in which a point on the smartphone display 931 is described by an i-coordinate and a j-coordinate.

In order to display what is presented on the display 911, the electronic device 910 obtains a resolution function based on the gaze of the user (e.g., the location of the gaze location indicator 999). Based on the resolution function, the electronic device 910 determines x×y non-uniformly spaced locations in the two-dimensional device coordinate system defined by a set of x×y scaling factors. Based on compositing virtual content (e.g., the virtual flowers 951 and the virtual clock 952) with a captured and processed image of the physical environment, the electronic device 910 respectively determines x×y pixel values for the x×y locations in the two-dimensional device coordinate system, generating a warped image. The warped image is used generate panel data provided to the display 911 which emits light based on the panel data.

In this way, content that is displayed by the laptop display 921 and/or the smartphone display 931 is presented on the display 911 after being captured in an image of the physical environment. However, this content may be distorted in the capturing and processing of the image of the physical environment. Such distortive processing may include point-of-view correction, color correction, lens distortion correction, etc. Accordingly, in various implementations, the content displayed by the laptop display 921 and/or the smartphone display 931 are directly transmitted by the laptop 920 and/or smartphone 930 to the electronic device 910. The content may be transmitted as display data via a wireless or wired connection. Then, the electronic device 910 generates the warped image based on compositing the display data as additional virtual content with the captured and processed image of the physical environment.

However, the speed at which the laptop 920 and/or smartphone 930 can generate and transmit the content to the electronic device 910 may be limited. For example, in various implementations, a video encoder of the laptop 920 may generate a fixed number of pixel values per frame (e.g., four-thousand pixel values every sixtieth of a second) or a fixed number of pixel values over any other time period, e.g., a second. As another example, in various implementations, the bandwidth of a communications channel between the laptop 920 and the electronic device 910 may limit the amount of data that can be transferred in a particular amount of time.

Thus, in various implementations, to reduce the number of pixel values calculated or transmitted, the laptop 920 and/or smartphone 930 generate foveated or warped images to transmit to the electronic device 910.

Figure 9B:
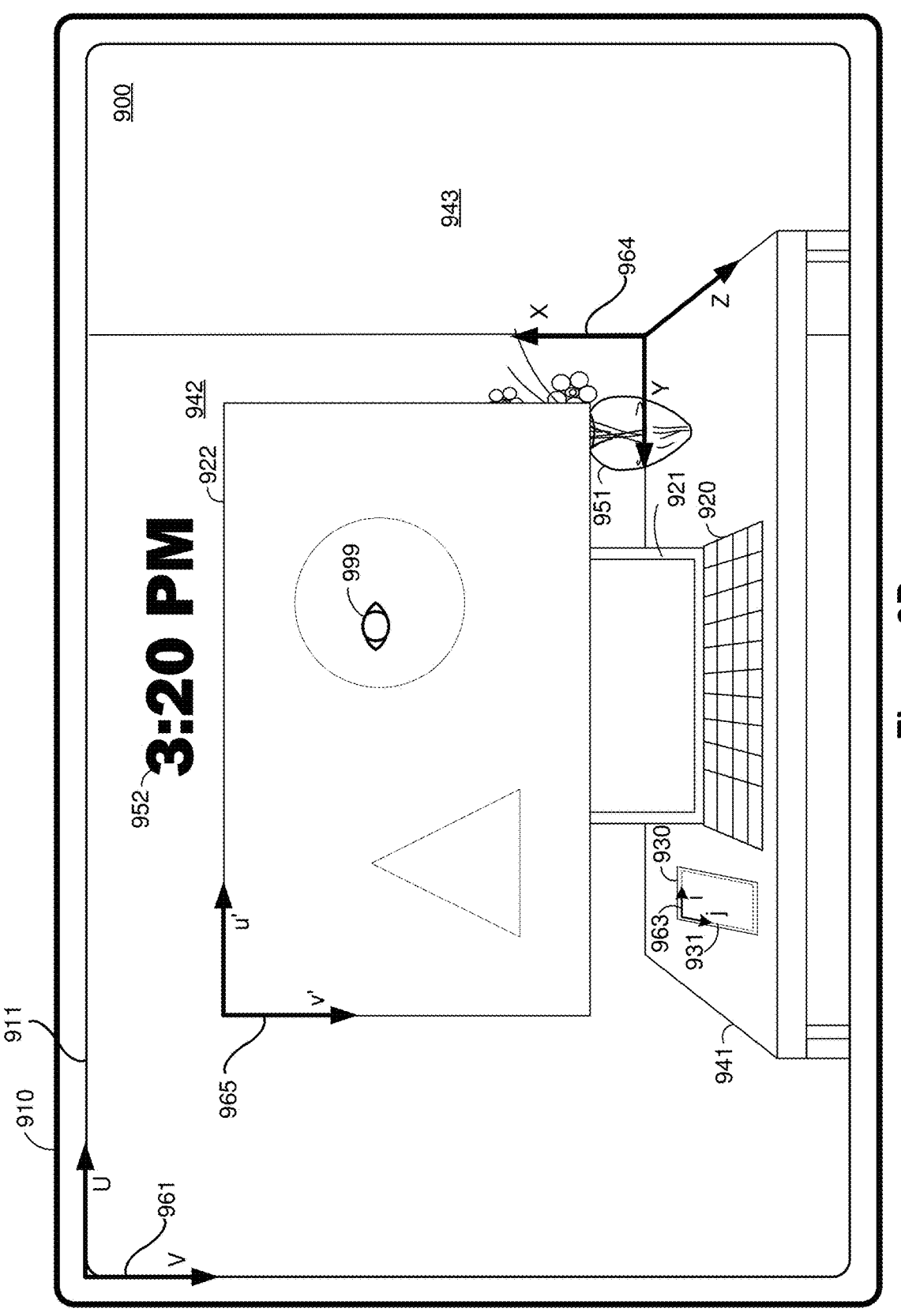

FIG. 9A illustrates a two-dimensional laptop coordinate system (represented by the axes 962) which is coplanar with the physical laptop display 921. FIG. 9B illustrates the XR environment 900 in which the two-dimensional laptop coordinate system (represented by the axes 965) is coplanar with a virtual laptop display 922. In various implementations, the virtual laptop display 922 is a world-locked virtual object that displays content received from the laptop 920.

Figure 9C:
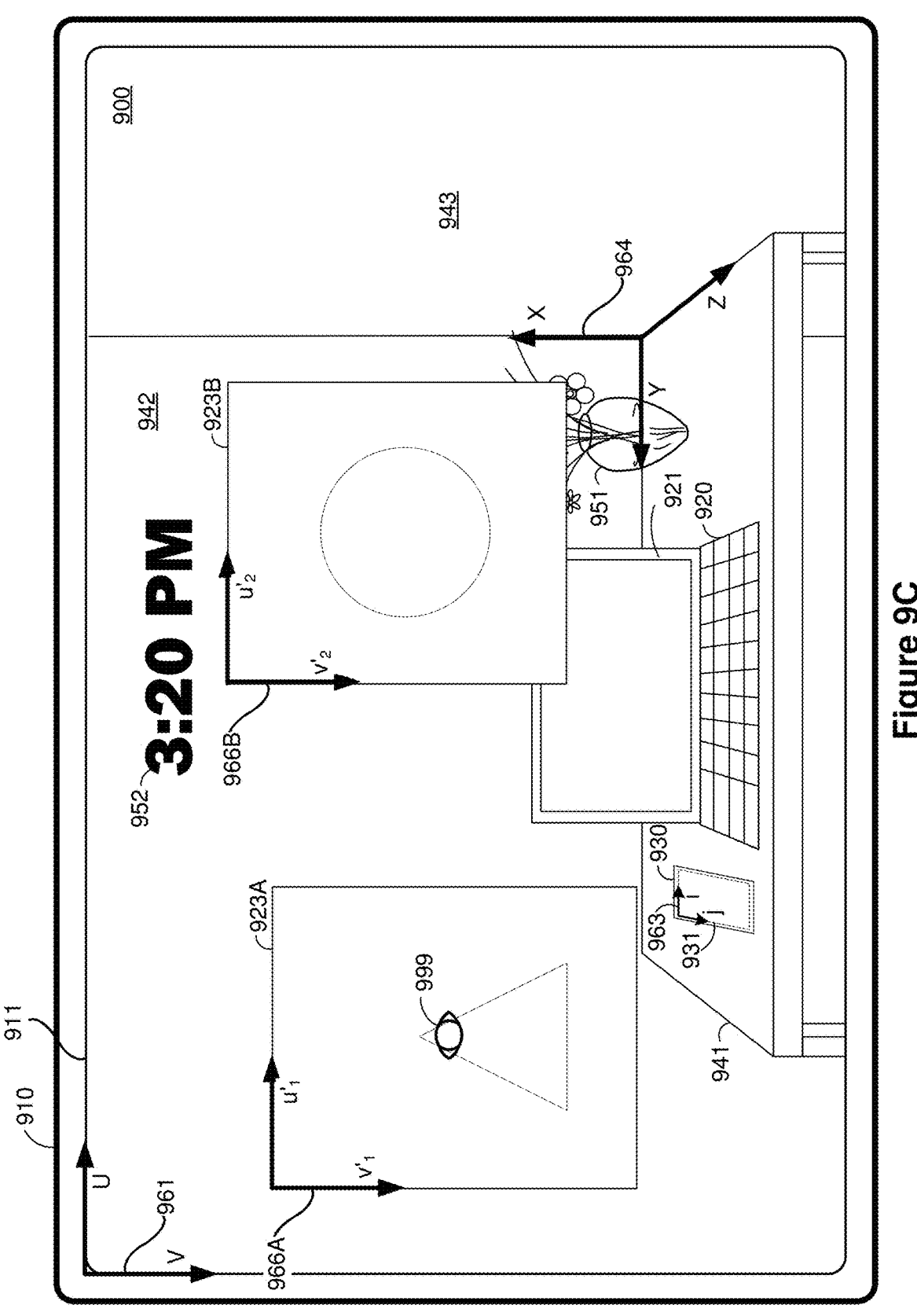

FIG. 9C illustrates a the XR environment 900 in which a first two-dimensional laptop coordinate system (represented by the axes 966A) is coplanar with a first virtual laptop display 923A and a second two-dimensional laptop coordinate system (represented by the axes 966B) is coplanar with a second virtual laptop display 923B. In various implementations, the first virtual laptop display 923A and the second virtual laptop display 923B are world-locked virtual objects that display content received from the laptop.

FIG. 10A is a flowchart representation of a method of displaying a display image in accordance with some implementations. In various implementations, the method 1000 is performed by a first device having a first display, one or more processors, and non-transitory memory (e.g., the electronic device 120 of FIG. 1 or the electronic device 910 of FIG. 9). In some implementations, the method 1000 is performed by processing logic, including hardware, firmware, software, or a combination thereof. In some implementations, the method 1000 is performed by a processor executing instructions (e.g., code) stored in a non-transitory computer-readable medium (e.g., a memory).

The method 1000 begins, in block 1010, with the first device obtaining gaze data indicative of a gaze of a user. In various implementations, the gaze data includes a gaze location in a three-dimensional XR coordinate system, such as the three-dimensional XR coordinate system represented by the axes 964 of FIG. 9A. In various implementations, the gaze data includes a gaze location in a two-dimensional coordinate system of the first device, such as the two-dimensional device coordinate system represented by the axes 961 of FIG. 9A. In various implementations, the gaze data includes a gaze location in a two-dimensional device coordinate system of a second device, such as the two-dimensional laptop coordinate system represented by the axes 962 of FIG. 9A or the axes 965 of FIG. 9B or the two-dimensional smartphone coordinate system represented by the axes 963. In various implementations, the gaze data includes multiple gaze locations in multiple two-dimensional coordinate systems of one or more second devices. For example, in FIG. 9B, the gaze data may include a gaze location in the two-dimensional laptop coordinate system represented by the axes 965 and a gaze location in the two-dimensional smartphone coordinate system represented by the axes 963. As another example, in FIG. 9C, the gaze data may include a gaze location in the first two-dimensional laptop coordinate system represented by the axes 966A and a gaze location in the second two-dimensional laptop coordinate system represented by the axes 966B.

In various implementations, obtaining the gaze data includes transforming the gaze data from a location in a first coordinate system to a location in a second coordinate system. For example, in various implementations, the device obtains the gaze location in the three-dimensional XR coordinate system and, based on the location of a physical or virtual display of the second device in the XR environment, determines the intersection of a gaze vector (from the first device to the location in the three-dimensional XR coordinate system) and the physical or virtual display of the second device to determine the gaze location in a two-dimensional device coordinate system of the second device. As another example, in various implementations, the device obtains the gaze location in the two-dimensional coordinate system of the first device and, based on the location of a physical or virtual display of the second device on the first display, determines the gaze location in a two-dimensional device coordinate system of the second device.

The method 1000 continues, in block 1020, with the first device transmitting, to a second device having a second display, warp parameters based on the gaze data. In various implementations, the warp parameters include the gaze location (e.g., in the two-dimensional device coordinate system of the second device). In various implementations, the warp parameters include multiple gaze locations (e.g., in a first two-dimensional coordinate system of the second device and a second two-dimensional coordinate system of the second device). In various implementations, the warp parameters include a maximum resolution (or a maximum of a resolution function). In various implementations, the parameters include a size of the area of maximum resolution (or a fovea size of a resolution function). In various implementations, the parameters include a minimum resolution (or an asymptote of a resolution function). In various implementations, the parameters include a falloff parameter (or a width of the resolution function or how quickly the resolution function falls off outside the fovea as the angle increases from the optical axis).

In various implementations, the first device generates the warp parameters based on the gaze data. In various implementations, the first device generates the warp parameters further based on a speed constraint indicative of a number of pixel values per unit time. In various implementations, the speed constraint may be based on a speed of an encoder of the second device. In various implementations, the speed constraint may be based on a speed of a decoder of the first device. In various implementations, the speed constraint may be based on a bandwidth of a communications channel between the second device and the first device.

The method 1000 continues, in block 1030, with the first device receiving, from the second device, display data based on the warp parameters. In various implementations, display data includes a content image. In various implementations, the first device receives, from the second device, the warp parameters in association with the content image. In various implementations, the content image is a foveated (but not warped) content image. In various implementations, the content image is a warped content image.

In various implementations, the first display data includes multiple content images. For example, in FIG. 9C, the electronic device 910 receives a first content image (including a triangle) for the first virtual laptop display 923A and a second content image (including a circle) for the second virtual laptop display 923B.

Upon receiving, from the first device, the warp parameters based on the gaze data, the second device generates the display data based on the warp parameters. As noted above, in various implementations, the display data includes a warped content image. For example, in various implementations, the second device determines a×b non-uniformly spaced locations in the two-dimensional coordinate system of the second device defined by a set of a×b scaling factors. The values of a and b may be based on the speed constraint. For example, in various implementations, the values of a and b are determined such that a×b is the number of pixels an encoder of the second device can generate each frame. The ratio of a and b may be determined by an aspect ratio of display of the second device. In various implementations, the second device determines the set of a×b scaling factors based on a second device resolution function defined by the warp parameters. The second device respectively determines a×b pixel values for the a×b locations in the two-dimensional coordinate system of the second device, generating the warped content image.

Thus, for example, in FIG. 9A, the laptop 920 generates display data in which the triangle is represented at a greater resolution than the circle because the user is looking at the triangle (as represented by the gaze location indicator 999). In contrast, in FIG. 9B, the laptop 920 generates display data in which the circle is represented at a greater resolution than the triangle because the user is looking at the circle (as represented by the gaze location indicator 999).

As another example, in various implementations, the display data includes multiple warped content images. For example, in various implementations, the second device determines $a_1 \times b_1$ non-uniformly spaced locations in a first two-dimensional coordinate system of the second device defined by a set of $a_1 \times b_1$ scaling factors and $a_2 \times b_2$ non-uniformly spaced locations in a second two-dimensional coordinate system of the second device defined by a set of $a_1 \times b_1$ scaling factors.

The values of $a_1$, $b_1$, $a_2$, and $b_2$ may be based on the speed constraint. For example, in various implementations, the values of $a_1$, $b_1$, $a_2$, and $b_2$ are determined such that $a_1 \times b_1 + a_2 \times b_2$ is the number of pixels an encoder of the second device can generate each frame. The ratio of $a_1$ and $b_1$ (and the ratio of $a_2$ and $b_2$) may be determined by an aspect ratio of display of the second device. The ratio of $a_1$ and $a_2$ may be determined by the warp parameters. For example, in FIG. 9C, the laptop 920 generates display data in which the first virtual laptop display 923A is represented at a greater resolution than the second virtual laptop display 923B because the user is looking at the first virtual laptop display 923A (as represented by the gaze location indicator 999).

In various implementations, the second device determines the set of $a_1 \times b_1$ and $a_2 \times b_2$ scaling factors based on a second device resolution function defined by the warp parameters. The second device respectively determines $a_1 \times b_1$ pixel values for the $a_1 \times b_1$ locations in the first two-dimensional coordinate system of the second device, generating a first warped content image. The second device respectively determines $a_2 \times b_2$ pixel values for the $a_2 \times b_2$ locations in the first two-dimensional coordinate system of the second device, generating a first warped content image.

The method 1000 continues, in block 1040, with the first device displaying, on the first display, a display image based on the display data. In various implementations, the first device generates a warped display image. For example, in various implementations, the first device determines A×B non-uniformly spaced locations in the two-dimensional coordinate system of the first device defined by a set of A×B scaling factors. In various implementations, the first device determines the set of A×B scaling factors based on a first device resolution function, which may be different than the second device resolution function. The first device respectively determines A×B pixel values for the A×B locations in the two-dimensional coordinate system of the first device, generating a warped display image. In various implementations, the first device determines the A×B pixel values based on a captured image of a physical environment. In various implementations, the first device determines the A×B pixel values based on virtual content. In various implementations, the first device determines the A×B pixel values based on compositing virtual content with a captured (and, in various implementations, processed) image of the physical environment.

For those of the A×B locations in the two-dimensional coordinate system of the first device that correspond to the second device (e.g., the portions of the warped display image that represent a physical or virtual display of the second device), the pixel values are determined based at least in part on the display data received from the second device. For example, for a particular location in the two-dimensional coordinate system of the first device that corresponds to the second device, the first device determines the corresponding location in the two-dimensional coordinate system of the second device. The first device selects, as the pixel value for the particular location in the two-dimensional coordinate system of the first device, the pixel value of the pixel of the warped content image corresponding to the corresponding location in the two-dimensional coordinate system of the second device. In various implementations, the first device generates, as the pixel value for the particular location in the two-dimensional coordinate system of the first device, an interpolated pixel value based on pixel values of pixels of the warped content image corresponding to the corresponding location in the two-dimensional coordinate system of the second device.

Accordingly, the warped content image is transformed, based on the resolution function of the second device and the resolution function of the first device, from a warped space of the second device to a warped space of the first device. In particular, in various implementations, the first device does not unwarp the display data from the warped space of the second device into the display space and re-warp the display data from the display space into the warped space of the first device. Thus, in various implementations, the first device transforms, based on the warp parameters (and intrinsic warp parameters associated with the first device), the display data. In various implementations, the method 1000 includes transforming the warped content image into a transformed warped content image based on the warp parameters and intrinsic warp parameters of the first device. In other implementations, the first device unwarps the display data from the warped space of the second device directly into the display space. Thus, in various implementations, the method includes unwarping the warped content image into an unwarped content image based on the warp parameters.

Figure 10B:
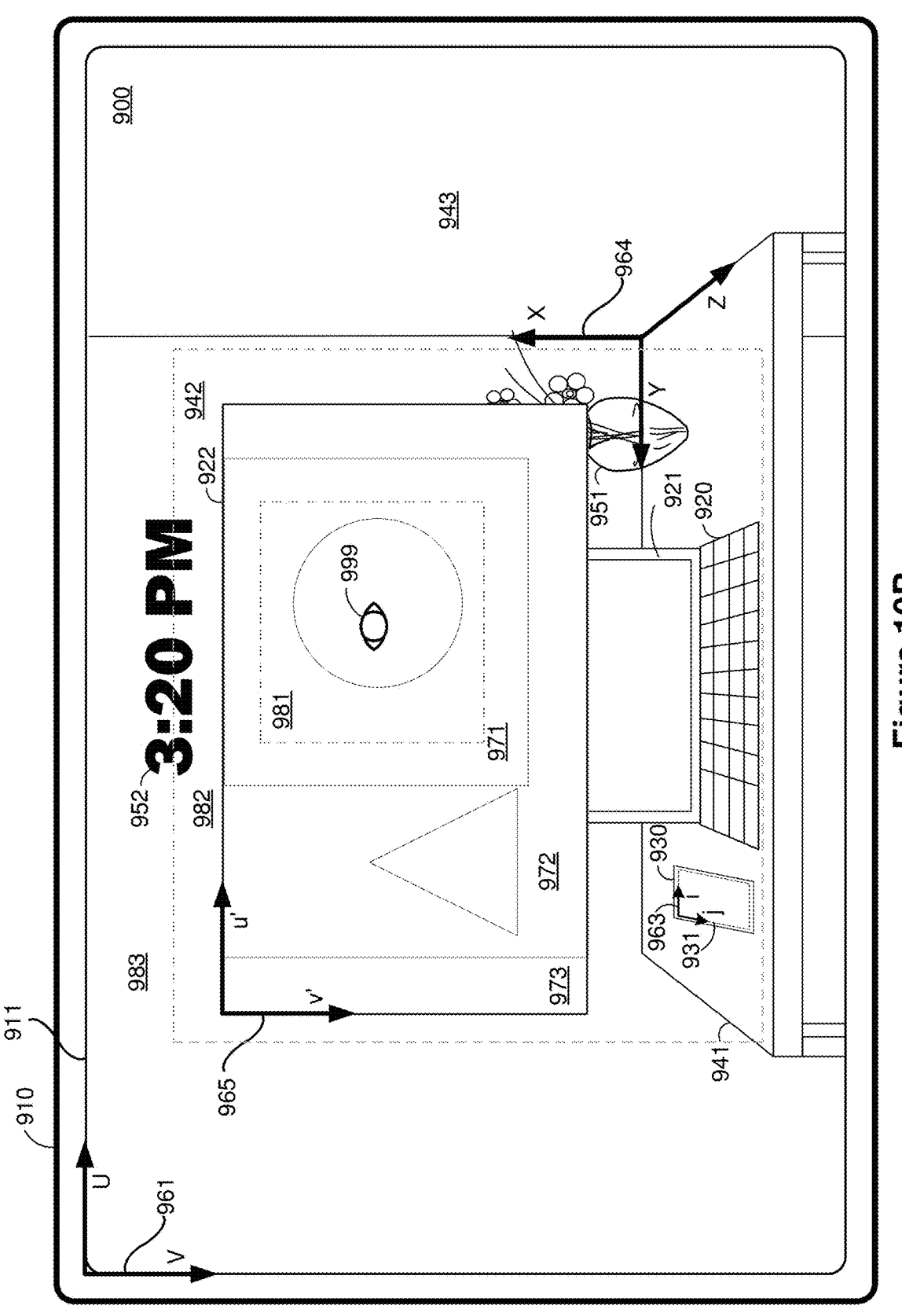
FIG. 10B illustrate areas of different resolution in the XR environment of FIGS. 9A-9C in accordance with some implementations.

FIG. 10B illustrates an example of a warped space of the laptop 920 and the warped space of the electronic device 910. In FIG. 10B, the content inner region 971 has a first resolution, the content middle region 972 has a second resolution less than the first resolution, and the content outer region 973 has a third resolution less than the second resolution. As the laptop generates a warped content image, three equal-sized areas of the warped content image (in the warped space of the laptop 920) corresponding to the content inner region 971, content middle region 972, and content outer region 973 represent three different-sized areas in the two-dimensional laptop coordinate system.

Similarly, the display inner region 981 has a fourth resolution, the display middle region 982 has a fifth resolution less than the fourth resolution, and the display outer region 983 has a sixth resolution less than the fifth resolution. As the electronic device 910 generates a warped display image, three equal-sized areas of the warped display image (in the warped space of the electronic device 910) corresponding to the content inner region 971, content middle region 972, and content outer region 973 represent three different-sized areas in the two-dimensional electronic device coordinate system.

Notably, the first resolution, the second resolution, and the third resolution may be different from the fourth resolution, the fifth resolution, and the sixth resolution. Further, the content inner region 971, content middle region 972, and content outer region 973 may be different than the display inner region 981, display middle region 982, and display outer region 983. For example, whereas the circle has the first resolution in the warped content image, the circle has the fourth resolution in the warped display image. As another example, whereas the triangle has the second resolution in the warped content image, the triangle has the fifth resolution in the warped display image. As another example, whereas the outer region 973 has the third resolution in the warped content image, the outer region 973 has the fifth resolution in the warped display image. Thus, whereas the triangle and the outer region 973 have different resolutions in the warped content image, the triangle and the outer region 973 have the same resolution in the warped display image.

In various implementations, one or more of the first resolution, the second resolution, or the third resolution is the same as the fourth resolution, the fifth resolution, or the sixth resolution. For example, the first resolution and the fourth resolution may both equal a maximum resolution.

The first device transforms the warped display image (and the corresponding set of scaling factors) into a transformed display image (and transformed scaling factors) such that each pixel value of the transformed display image represents an area corresponding to a whole number of pixel locations (e.g., 1, 4, 9, 16, etc.). The transformed display image (and the transformed scaling factors) are provided to a display of the first device that unwarps the display image and displays the display image (where each pixel having a pixel location is associated with a respective pixel value).

In various implementations, the display data is displayed in the display image at a location of a physical display of the second device. For example, in FIG. 9A, the content generated by the laptop 920 is displayed at the location of the laptop display 921. In various implementations, when the display data is displayed at the location of the physical display of the second device, the second device does not display content on the physical display, preventing viewing of the content by other users to enhance privacy. In various implementations, when the display data is displayed at the location of the physical display of the second device, the second device also displays the content on the physical display, allowing viewing of the content by other users, enhancing collaborative productivity.

In various implementations, the display data is displayed in the display image at a location of a virtual display of the second device. For example, in FIG. 9B, the content generated by the laptop 920 is displayed at the location of the virtual laptop display 922. In various implementations, when the display data is displayed at the location of the virtual display of the second device, the second device does not display content on the physical display, preventing viewing of the content by other users to enhance privacy. In various implementations, when the display data is displayed at the location of the virtual display of the second device, the second device also displays the content on the physical display, allowing viewing of the content by other users, enhancing collaborative productivity. In various implementations, when the display data is displayed at the location of virtual display, the first device also displays the display data at the location of the physical display of the second device, creating, for the user, a visual link between the content and the second device.

In various implementations, the method 1000 is performed in response to detecting the second device and a user input to associate (e.g., "pair") the second device with the first device. In various implementations, the method 1000 is performed for at least one third device. For example, in various implementations, the method 1000 includes, transmitting to a third device having a third display, additional warp parameters based on the gaze data. In various implementations, the first device generates the additional warp parameters are based on the gaze data, e.g., the gaze location in a two-dimensional coordinate system of the third device.

In various implementations, the first device generates the additional warp parameters further based on a speed constraint indicative of a number of pixel values per unit time. In various implementations, first device generates the warp parameters based on a speed constraint of the third device (and/or generates the additional warp parameters based on a speed constraint of the second device).

In various implementations, the method 1000 includes receiving, from the third device additional display data based on the additional warp parameters and displaying, on the first display, the display image based on the additional display data.

Figure 11:
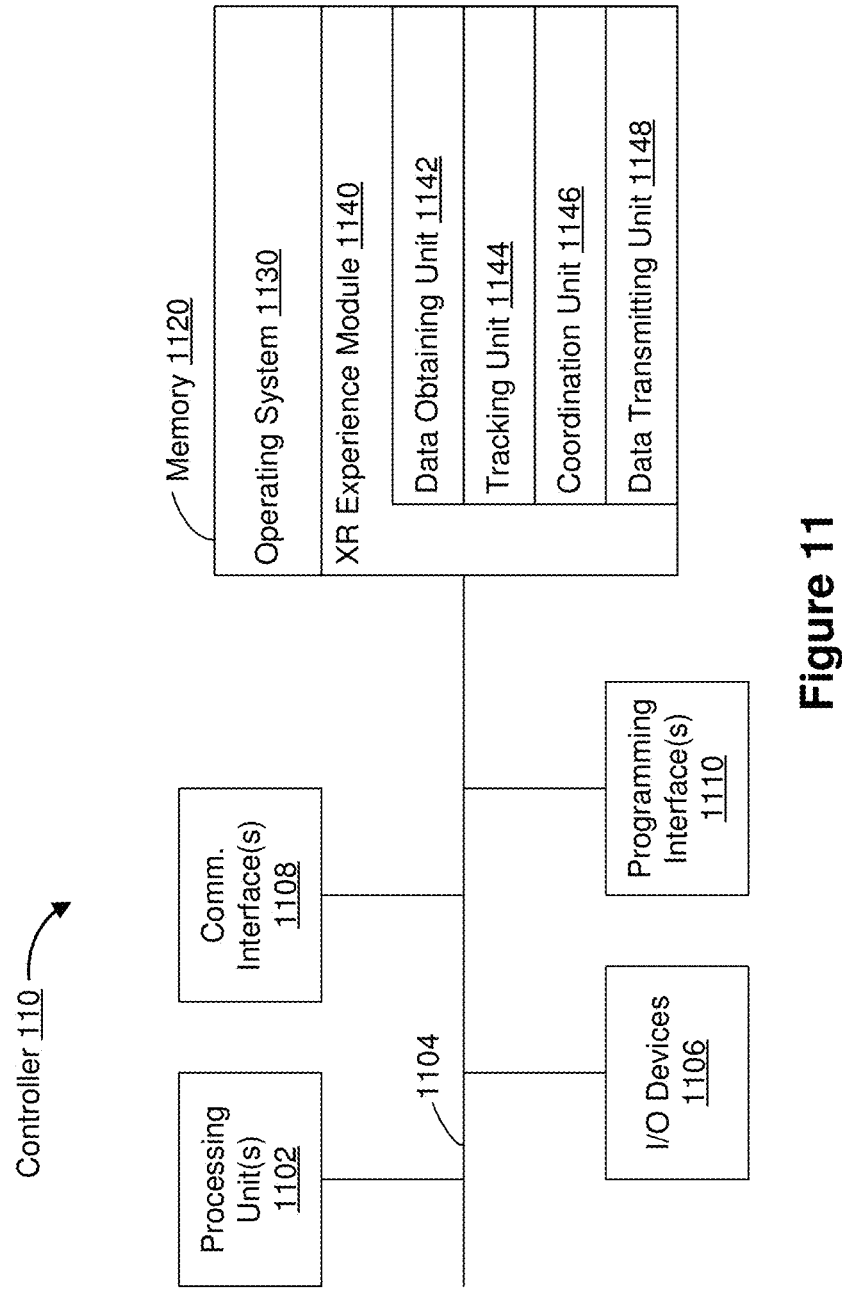
FIG. 11 is a block diagram of an example controller in accordance with some implementations.

FIG. 11 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 1102 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 1106, one or more communication interfaces 1108 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 1110, a memory 1120, and one or more communication buses 1104 for interconnecting these and various other components.

In some implementations, the one or more communication buses 1104 include circuitry that interconnects and controls communications between system components. In some implementations, the one or more I/O devices 1106 include at least one of a keyboard, a mouse, a touchpad, a joystick, one or more microphones, one or more speakers, one or more image sensors, one or more displays, and/or the like.

The memory 1120 includes high-speed random-access memory, such as dynamic random-access memory (DRAM), static random-access memory (SRAM), double-data-rate random-access memory (DDR RAM), or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. In some implementations, the memory 1120 or the non-transitory computer readable storage medium of the memory 1120 stores the following programs, modules and data structures, or a subset thereof including an optional operating system 1130 and an XR experience module 1140.

The operating system 1130 includes procedures for handling various basic system services and for performing hardware dependent tasks. In some implementations, the XR experience module 1140 is configured to manage and coordinate one or more XR experiences for one or more users (e.g., a single XR experience for one or more users, or multiple XR experiences for respective groups of one or more users). To that end, in various implementations, the XR experience module 1140 includes a data obtaining unit 1142, a tracking unit 1144, a coordination unit 1146, and a data transmitting unit 1148.

In some implementations, the data obtaining unit 1142 is configured to obtain data (e.g., presentation data, interaction data, sensor data, location data, etc.) from at least the electronic device 120 of FIG. 1. To that end, in various implementations, the data obtaining unit 1142 includes instructions and/or logic therefor, and heuristics and metadata therefor.

In some implementations, the tracking unit 1144 is configured to map the physical environment 105 and to track the position/location of at least the electronic device 120 with respect to the physical environment 105 of FIG. 1. To that end, in various implementations, the tracking unit 1144 includes instructions and/or logic therefor, and heuristics and metadata therefor.

In some implementations, the coordination unit 1146 is configured to manage and coordinate the XR experience presented to the user by the electronic device 120. To that end, in various implementations, the coordination unit 1146 includes instructions and/or logic therefor, and heuristics and metadata therefor.

In some implementations, the data transmitting unit 1148 is configured to transmit data (e.g., presentation data, location data, etc.) to at least the electronic device 120. To that end, in various implementations, the data transmitting unit 1148 includes instructions and/or logic therefor, and heuristics and metadata therefor.

Although the data obtaining unit 1142, the tracking unit 1144, the coordination unit 1146, and the data transmitting unit 1148 are shown as residing on a single device (e.g., the controller 110), it should be understood that in other implementations, any combination of the data obtaining unit 1142, the tracking unit 1144, the coordination unit 1146, and the data transmitting unit 1148 may be located in separate computing devices.

Moreover, FIG. 11 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 12:
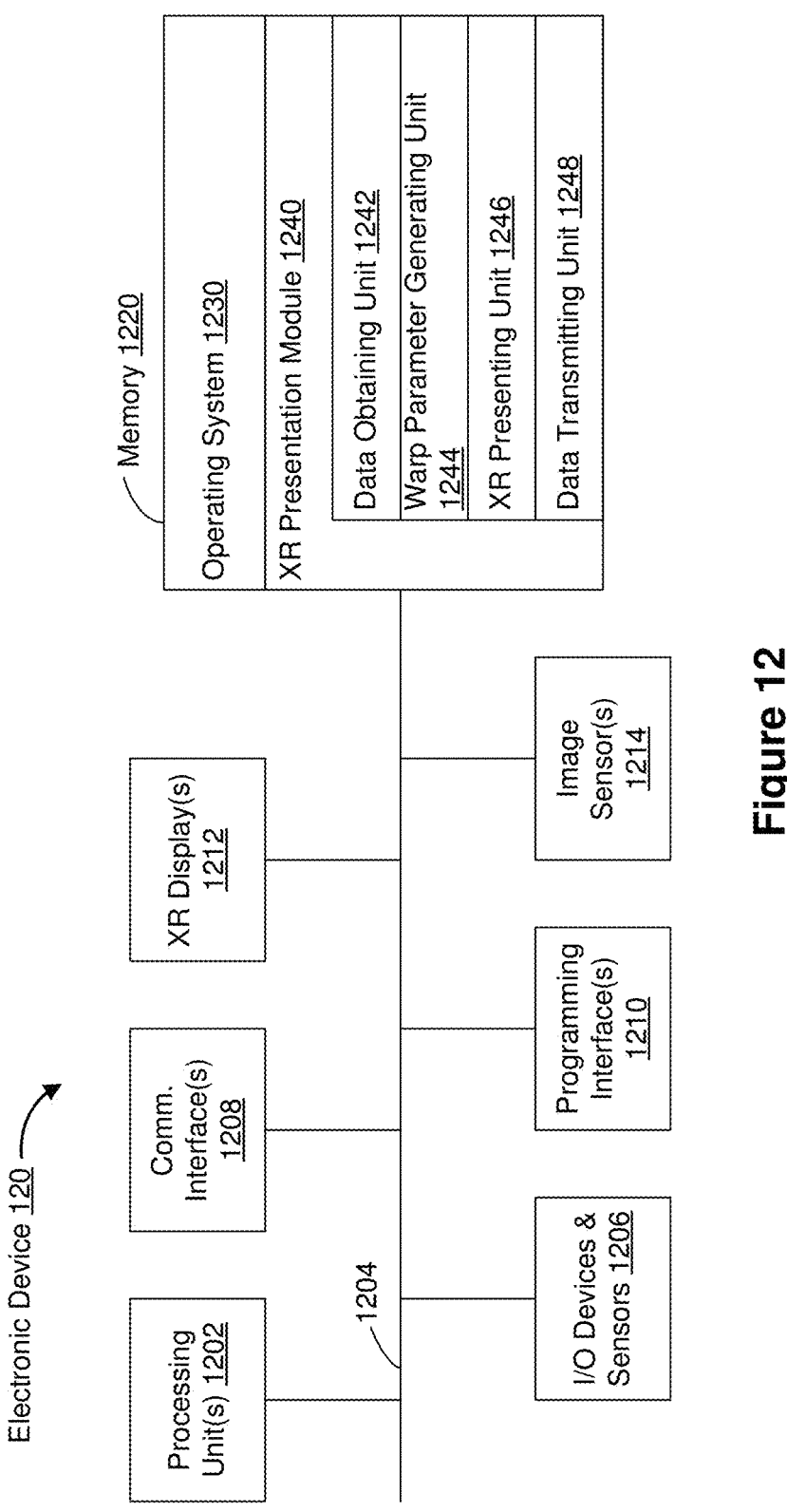
FIG. 12 is a block diagram of an example electronic device in accordance with some implementations.

FIG. 12 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 1202 (e.g., microprocessors, ASICs, FPGAs, GPUs, CPUs, processing cores, and/or the like), one or more input/output (I/O) devices and sensors 1206, one or more communication interfaces 1208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1210, one or more XR displays 1212, one or more optional interior- and/or exterior-facing image sensors 1214, a memory 1220, and one or more communication buses 1204 for interconnecting these and various other components.

In some implementations, the one or more communication buses 1204 include circuitry that interconnects and controls communications between system components. In some implementations, the one or more I/O devices and sensors 1206 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1212 are configured to provide the XR experience to the user. In some implementations, the one or more XR displays 1212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1212 correspond to diffractive, reflective, polarized, holographic, etc. waveguide displays. For example, the electronic device 120 includes a single XR display. In another example, the electronic device 120 includes an XR display for each eye of the user. In some implementations, the one or more XR displays 1212 are capable of presenting MR and VR content.

In some implementations, the one or more image sensors 1214 are configured to obtain image data that corresponds to at least a portion of the face of the user that includes the eyes of the user (any may be referred to as an eye-tracking camera). In some implementations, the one or more image sensors 1214 are configured to be forward-facing so as to obtain image data that corresponds to the physical environment as would be viewed by the user if the electronic device 120 was not present (and may be referred to as a scene camera). The one or more optional image sensors 1214 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1220 includes high-speed random-access memory, such as DRAM, SRAM, DDR RAM, or other random-access solid-state memory devices. In some implementations, the memory 1220 includes non-volatile memory, such as one or more magnetic disk storage devices, optical disk storage devices, flash memory devices, or other non-volatile solid-state storage devices. The memory 1220 optionally includes one or more storage devices remotely located from the one or more processing units 1202. The memory 1220 comprises a non-transitory computer readable storage medium. In some implementations, the memory 1220 or the non-transitory computer readable storage medium of the memory 1220 stores the following programs, modules and data structures, or a subset thereof including an optional operating system 1230 and an XR presentation module 1240.

The operating system 1230 includes procedures for handling various basic system services and for performing hardware dependent tasks. In some implementations, the XR presentation module 1240 is configured to present XR content to the user via the one or more XR displays 1212. To that end, in various implementations, the XR presentation module 1240 includes a data obtaining unit 1242, a warp parameter generating unit 1244, an XR presenting unit 1246, and a data transmitting unit 1248.

In some implementations, the data obtaining unit 1242 is configured to obtain data (e.g., presentation data, interaction data, sensor data, location data, etc.) from at least the controller 110 of FIG. 1. To that end, in various implementations, the data obtaining unit 1242 includes instructions and/or logic therefor, and heuristics and metadata therefor. In some implementations, the data obtaining unit 1242 obtains display data from another device.

In some implementations, the warp parameter generating unit 1244 is configured to generate warp parameters based on gaze information of a user. To that end, in various implementations, the warp parameter generating unit 1244 includes instructions and/or logic therefor, and heuristics and metadata therefor.

In some implementations, the XR presenting unit 1246 is configured to display content via the one or more XR displays 1212. To that end, in various implementations, the XR presenting unit 1246 includes instructions and/or logic therefor, and heuristics and metadata therefor. In some implementations, the XR presenting unit 1246 displays a display image based on display data received from another device.

In some implementations, the data transmitting unit 1248 is configured to transmit data (e.g., presentation data, location data, etc.) to at least the controller 110. To that end, in various implementations, the data transmitting unit 1248 includes instructions and/or logic therefor, and heuristics and metadata therefor. In some implementations, the data transmitting unit 1248 is configured to transmit warp parameters to another device.

Although the data obtaining unit 1242, the warp parameter generating unit 1244, the XR presenting unit 1246, and the data transmitting unit 1248 are shown as residing on a single device (e.g., the electronic device 120), it should be understood that in other implementations, any combination of the data obtaining unit 1242, the warp parameter generating unit 1244, the XR presenting unit 1246, and the data transmitting unit 1248 may be located in separate computing devices.

Moreover, FIG. 12 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 13A-13I are an example of first device 1300 warping and processing unwarped image data based on gaze data from a second device in accordance with some implementations. In some implementations and with reference to FIG. 9A, the first device 1300 corresponds to the laptop 920 having the laptop display 921, and the second device corresponds to the electronic device 910.

Figure 13A:
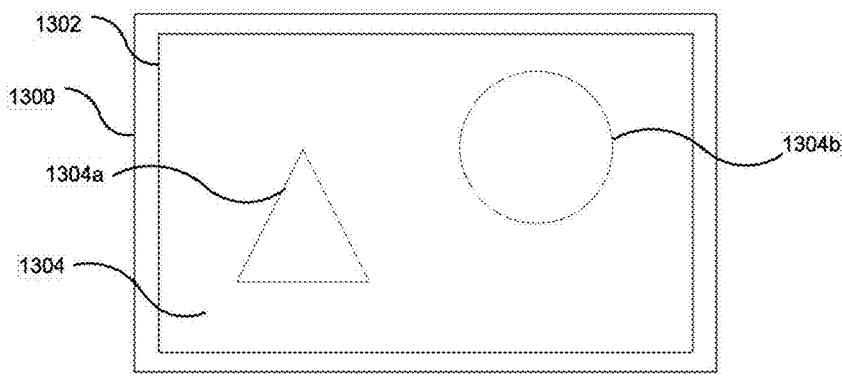
FIGS. 13A-13I are an example of first device warping and processing unwarped image data based on gaze data from a second device in accordance with some implementations.

As illustrated in FIG. 13A, the first device 1300 displays, on a first display 1302, an unwarped image 1304. The unwarped image 1304 includes a triangle 1304a and a circle 1304b. The unwarped image 1304 is represented by unwarped image data (e.g., display data). The unwarped image data may represent one or more unwarped images that exist in unwarped space (e.g., display space). In various implementations, the first device 1300 locally stores the unwarped image data. For example, the first device 1300 stores the unwarped image data in a non-transitory memory (e.g., cache) of the first device 1300.

Figure 13B:
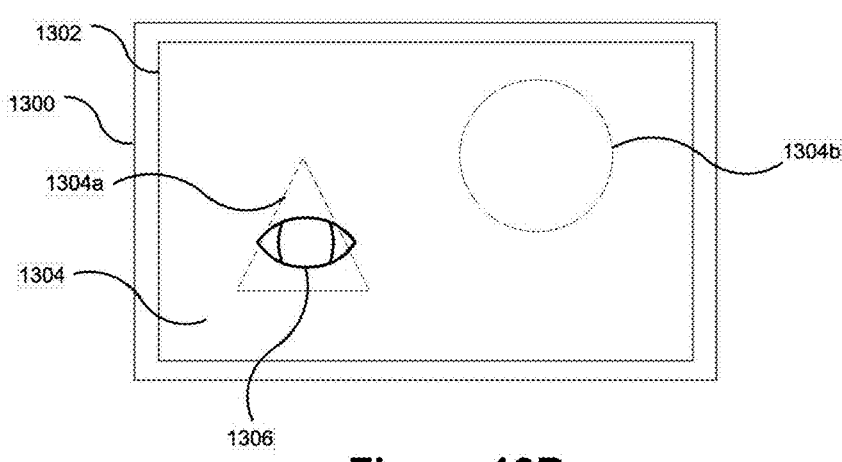
Figure 13C:
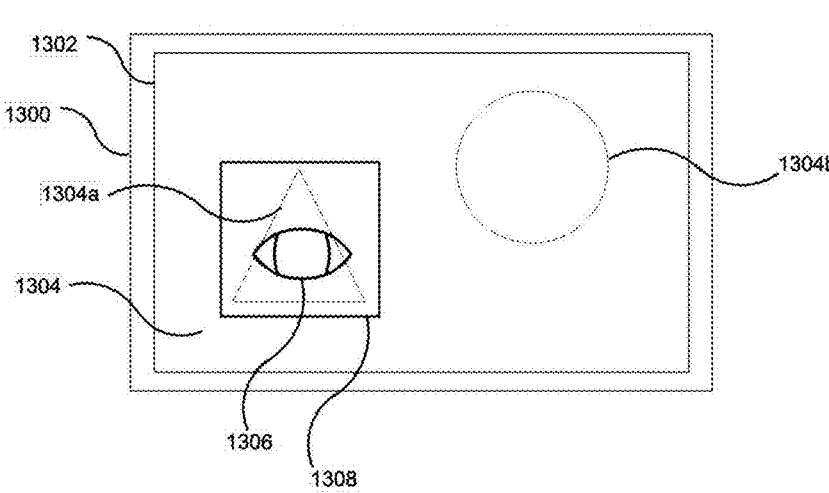

According to various implementations, the first device 1300 warps the unwarped image data, based on gaze data from the second device. For example, with reference to FIG. 9A, the second device corresponds to the electronic device 910, and the electronic device 910 generates gaze data and transmits the gaze data to the laptop 920. The gaze data may be indicative of a gaze location of a user of the second device. For example, as illustrated in FIG. 13B, a gaze indicator 1306 indicates that the gaze location is directed to the triangle 1304a. The gaze indicator 1306 may or may not be displayed on the first display 1302. In some implementations, the gaze data indicates one or more warp parameters, as are described herein. According to various implementations, the first device 1300 determines, based on the gaze data, a portion of the unwarped image data corresponding to the gaze location. For example, as illustrated in FIG. 13C, the first device 1300 determines a rectangular portion 1308 of the unwarped image 1304 that approximately corresponds to the gaze location. The rectangular portion 1308 is illustrated in FIG. 13C for purely explanatory purposes.

According to various implementations, the first device 1300 generates warped image data based at least in part on the portion of the unwarped image data corresponding to the gaze location. The warped image data includes a first portion corresponding to a downscaled representation of the unwarped image data. Moreover, the warped image data includes a second portion corresponding to a representation of the portion of the unwarped image data. Thus, in some implementations, the second portion of the warped image data indicates a full-scaled representation of a sub-portion of the unwarped image data, whereas the first portion indicates a downscaled representation of the entirety of the unwarped image data.

Figure 13D:
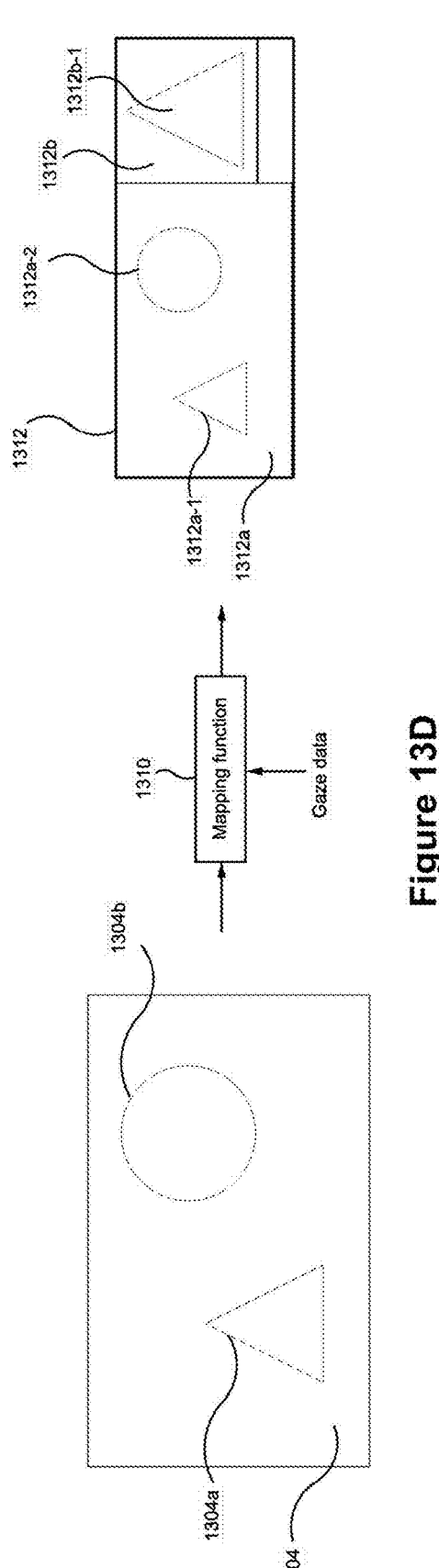

In some implementations, generating the warped image data includes applying a warping function. For example, as illustrated in FIG. 13D, the first device 1300 generates, via a mapping function 1310, a warped image 1312 by warping the unwarped image 1304 based on the gaze data. The warped image 1312 is represented by warped image data, which may be locally stored at the first device 1300. The warped image 1312 includes a first region 1312a and a second region 1312b. The first region 1312a corresponds to a downscaled (e.g., reduced size) representation of the unwarped image 1304. Namely, the first region 1312a includes a downscaled representation 1312a-1 of the triangle 1304a and a downscaled representation 1312a-2 of the circle 1304b. The second region 1312b corresponds to a full-scaled representation of the rectangular portion 1308 of the unwarped image 1304 that corresponds to the gaze location. Accordingly, the second region 1312b includes a full-scaled representation 1312b-1 of the triangle 1304a. Details regarding the mapping function 1310 are provided below.

Figure 13F:
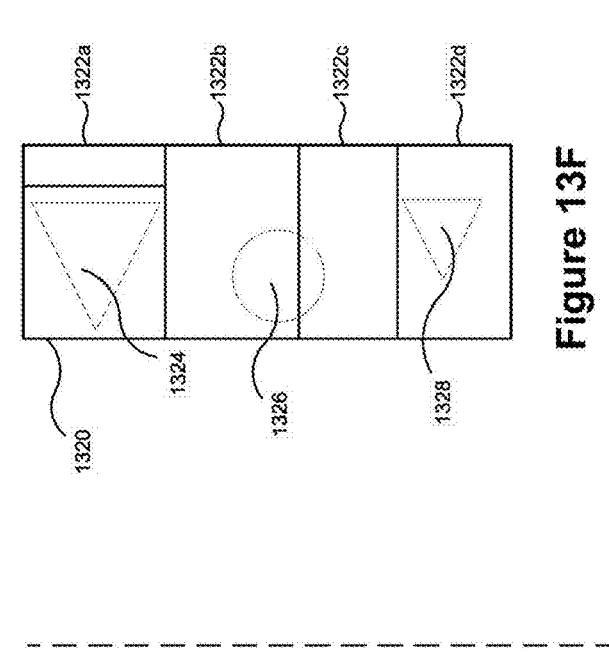
Figure 13E:
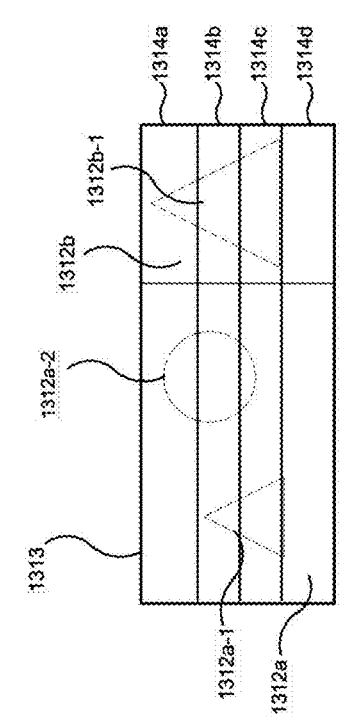

In some implementations, the first device 1300 arranges the warped image data into a first plurality of subframes of a frame for more efficient processing. For example, as illustrated in FIG. 13E, the first device 1300 arranges the warped image data into a first plurality of subframes 1314a-1314d of a frame 1313. The first plurality of subframes 1314a-1314d corresponds to a first subframe 1314a, a second subframe 1314b, a third subframe 1314c, and a fourth subframe 1314d. Subframes enable the first device 1300 to encode different portions of the warped image data at different times and/or at different encoding rates, providing the first device 1300 more control and enabling the first device 1300 to use less processing resources. Subframes also enable the first device 1300 to transmit, to the second device, different portions of the warped image data at different times, enabling the second device to concurrently receive and decode different portions of the warped image data. For example, the second device receives, from the first device 1300, a first subframe of the first plurality of subframes. Continuing with this example, the second device decodes the first subframe while receiving, from the first device 1300, a second subframe of the first plurality of subframes, thereby reducing latency.

In some implementations, to further enhance efficiencies, the first device 1300 rotates (e.g., transposes) at least a portion of the frame 1313. Rotating a frame 1313 enables the full-scale representation 1312b-1 of the triangle 1304a to be included in a single subframe. For example, FIG. 13F illustrates a first transposed frame 1320 including a second plurality of subframes 1322a-1322d. The first transposed frame 1320 includes a transposed full-scale representation 1324 of the triangle 1304a in the fifth subframe 1322a, a transposed downscaled representation 1326 of the circle 1304b spanning across the sixth subframe 1322b and the seventh subframe 1322c, and a transposed downscaled representation 1328 of the triangle 1304a in the eighth subframe 1322d. Notably, the transposed full-scale representation 1324 of the triangle 1304a is included in a single subframe (the fifth subframe 1322a), in contrast to the pre-transposed frame illustrated in FIG. 13E, in which the full-scaled representation 1312b-1 of the triangle 1304a spans multiple subframes. Having the full-scaled (e.g., full information bearing) transposed full-scale representation 1324 of the triangle 1304a in a single subframe enable more efficient encoding by the first device 1300, and also enables more efficient transmission to the second device and subsequent decoding by the second device.

Figures 13G, 13H, 13I:
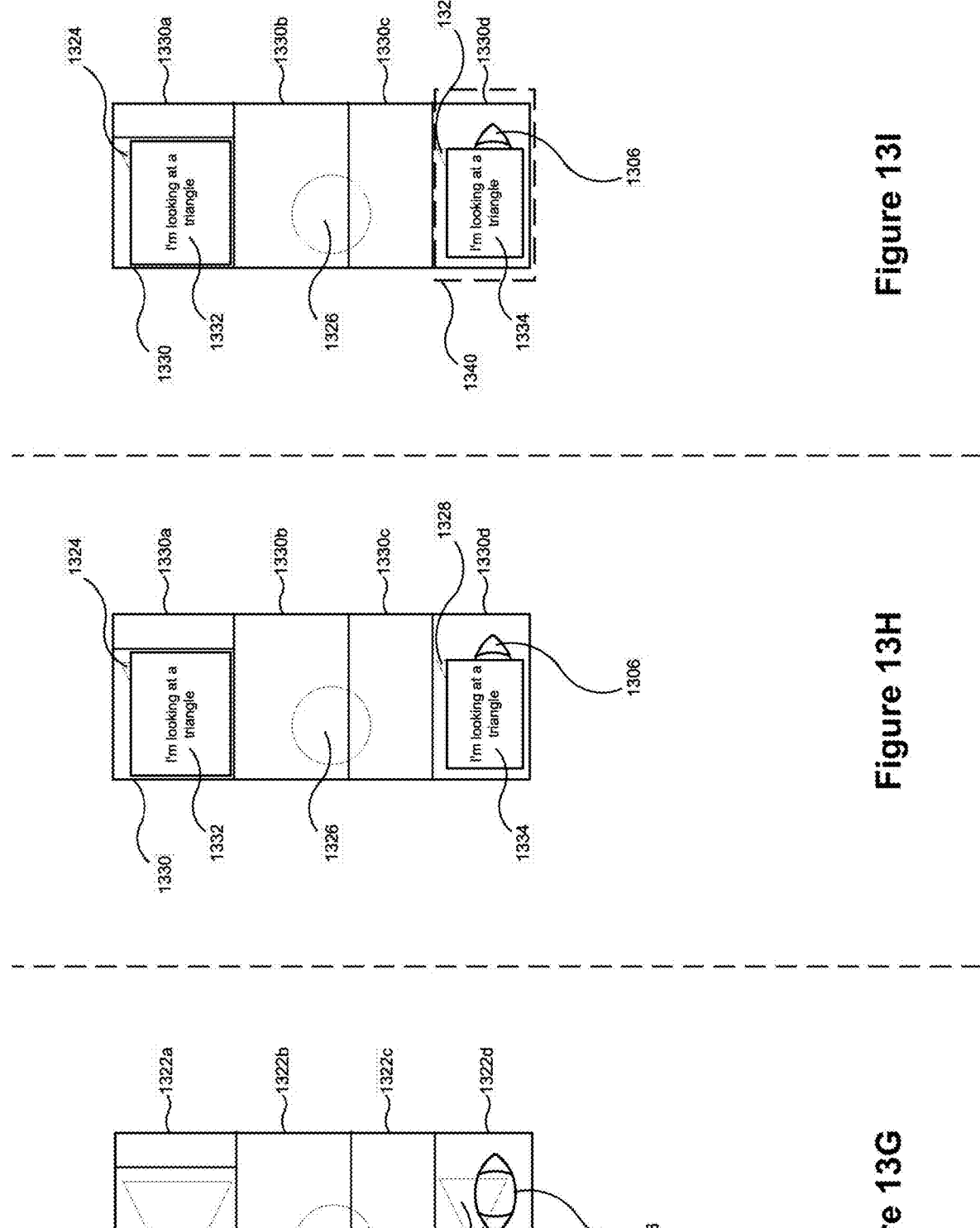

In some implementations, to further enhance efficiencies, the first device 1300 foregoes encoding a particular subframe of a transposed frame, based on the gaze data and a scene change associated with the unwarped image data. As one example, at a first time, the first device 1300 determines that the gaze location is associated with the eighth subframe 1322d, as illustrated by the gaze indicator 1306 in FIG. 13G. Accordingly, the first device 1300 identifies the eighth subframe 1322d. Continuing with this example, at a second time later than the first time, while the gaze location continues to be associated with the eighth subframe 1322d, the user begins typing text of "I'm looking at a triangle." The text is at a location that is proximate to gaze location. The first device 1300 warps unwarped image data representing the text according to various implementations disclosed herein, and arranges and rotates the warped image data to generate a second transposed frame 1330, as illustrated in FIG. 13H. The second transposed frame 1330 includes a ninth subframe 1330a, a tenth subframe 1330b, an eleventh subframe 1330c, and a twelfth subframe 1330d. The ninth subframe 1330a include the transposed full-scale representation 1324 of the triangle 1304a and a transposed full-scaled representation 1332 of the text. The twelfth subframe 1330d includes the transposed downscaled representation 1328 of the triangle 1304a and a transposed downscaled representation 1334 of the text. In various implementations, the first device 1300 detects a scene change based on the unwarped image data, and determines the scene change corresponds to the portion of the unwarped image data corresponding to the gaze location. Continuing with the previous example, the first device 1300 determines that the scene change corresponds to a text change between the eighth subframe 1322d and the twelfth subframe 1330d, and determines that the user gaze is associated with the eighth subframe 1322d and with the twelfth subframe 1330d. Because the ninth subframe 1330a include a transposed full-scale representation of the same content in the downscaled twelfth subframe 1330d, in some implementations the first device 1300 processes (e.g., encodes) the ninth subframe 1330a and skips processing (e.g., encoding) the twelfth subframe 1330d, thereby reducing processor utilization. Furthermore, in some implementations, the first device 1300 transmits, to the second device, the processed ninth subframe 1330a and skips transmitting the twelfth subframe 1330d to the second device. The second device may then decode the processed ninth subframe 1330a, and copy the decoded result to a region that would otherwise have been based on the twelfth subframe 1330d. The skipped twelfth subframe 1330d is illustrated in FIG. 13I by a skip indicator 1340.

FIG. 14 is a flowchart representation of a method 1400 of generating warped image data based on gaze data in accordance with some implementations. In various implementations, the method 1400 is performed by a first device having a display, one or more processors, and non-transitory memory (e.g., the laptop 920 of FIG. 9). In some implementations, the method 1400 is performed by processing logic, including hardware, firmware, software, or a combination thereof. In some implementations, the method 1400 is performed by a processor executing instructions (e.g., code) stored in a non-transitory computer-readable medium (e.g., a memory).

As represented by block 1402, the method 1400 includes, while storing unwarped image data in the non-transitory memory, obtaining, from the second device, gaze data indicative of a gaze location of a user. The gaze location can be one or more points in space. For example, the gaze location may be approximated by a triangular, circular, or ovular region in space. As one example, with reference to FIG. 13C, the gaze location is indicated by the gaze indicator 1306. In some implementations, the gaze data includes one or more warp parameters.

The unwarped image data exists in unwarped space (e.g., display space). For example, the unwarped image data corresponds to display data that is displayable by the display of the first electronic device. The unwarped image data may represent a sequence of one or more images. In some implementations, the method 1400 includes displaying, on the display, one or more images represented by the unwarped image data, such as the unwarped image 1304 displayed on the first display 1302 in FIG. 13A.

As represented by block 1404, the method 1400 includes determining, based on the gaze data, a portion of the unwarped image data corresponding to the gaze location. For example, with reference to FIG. 13C, the first device 1300 determines the rectangular portion 1308 of the unwarped image 1304 that corresponds to the gaze location, based on the gaze data.

As represented by block 1406, the method 1400 includes generating warped image data by warping the unwarped image data. As represented by block 1408, the warped image data includes a first portion corresponding to a downscaled representation of the unwarped image data, and includes a second portion corresponding to a representation of the portion of the unwarped image data. For example, with reference to FIG. 13D, the first portion corresponds to the a downscaled (e.g., reduced size) representation of the unwarped image 1304, and the second portion corresponds to a full-scaled representation of the rectangular portion 1308 of the unwarped image 1304 that corresponds to the gaze location. The first portion may correspond a lower resolution version of the entire unwarped image. The second portion may correspond to a full-scaled representation of the gaze portion. The first portion may have a lower pixel density (e.g., a lower resolution) than the unwarped image, whereas the second portion has the same pixel density (e.g., same resolution) as the unwarped image. Thus, in some implementation, the first portion is associated with a first resolution level, and the second portion is associated with a second resolution level different from the first resolution level. In some implementations, the warped image further includes a third region that is associated with a third resolution level different from the first and second resolution levels. In some implementations, the method 1400 includes storing pixels values associated with the second portion in a pixel buffer of the first device.

As represented by block 1410, in some implementations, generating the warped image data by warping the unwarped image data includes applying a mapping function (e.g., the mapping function 1310 in FIG. 13D). The mapping function maps between unwarped space and warped space, based on the gaze data. For example, in some implementations, applying the mapping function includes identifying, based on the unwarped image data, a plurality of coordinate values in unwarped space. Continuing with this example, applying the mapping function includes, for each coordinate value of the plurality of coordinate values in unwarped space, determining a distance between a particular coordinate value and the gaze location, and mapping the particular coordinate value to the warped space based on the distance. For example, for a distance greater than an upper threshold, the method 1400 includes mapping a coordinate value from unwarped space to a coordinate value represented by the first portion of the warped image data. For example, for a distance greater than a lower threshold and less than the upper threshold, the method 1400 includes mapping a coordinate value from unwarped space to two coordinate values respectively represented by the first and second portions of the warped image data. For example, for a distance less than the lower threshold, the method 1400 includes mapping a coordinate value from unwarped space to a coordinate value represented by the second portion of the warped image data.

As represented by block 1412, the method includes processing the warped image data for transmission to the second device.

For example, as represented by block 1414, processing, by the first device, the warped image data includes arranging the warped image data into a first plurality of subframes of a frame. To that end, in some implementations, the method 1400 includes generating the first plurality of subframes based on the warped image data. The frame is associated with a single point in time. For example, the frame is associated with a single image that is displayed on the display of the first device. As one example, with reference to FIG. 13E, the frame 1313 includes to the first subframe

1314*a*, the second subframe 1314*b*, the third subframe 1314*c*, and the fourth subframe 1314*d*. In some implementations, the second portion of the warped image data corresponds to two or more of the first plurality of subframes. For example, with reference to FIG. 13E, the full-scaled representation 1312*b*-1 of the triangle 1304*a* (represented by the second portion of the warped image data) spans the first subframe 1314*a*, the second subframe 1314*b*, and the third subframe 1314*c*.

In some implementations, processing the warped image data includes transposing the frame to generate a transposed frame, as represented by block 1416. The transposed frame includes a second plurality of subframes. In some implementations, the entirety of the second portion of the warped image data may correspond to a first subframe of the second plurality of subframes. Continuing with the previous example, the method 1400 includes transposing the frame 1313 to generate the first transposed frame 1320 including second plurality of subframes 1322*a*-1322*d*, as illustrated in FIGS. 13E and 13F. The transposed full-scale representation 1324 of the triangle 1304*a* is included in a single subframe (the fifth subframe 1322*a*), as opposed to spanning multiple subframes as illustrated in FIG. 13E.

In some implementations, the method 1400 includes identifying a second subframe of the second plurality of subframes (of the transposed frame) that is associated with the portion of the unwarped image data corresponding to the gaze location. Moreover, processing the warped image data includes processing a first subframe of the second plurality of subframes without processing the identified second subframe of the second plurality of subframes, thereby reducing processor utilization. For example, with reference to FIGS. 13H and 13I, the twelfth subframe 1330*d* is not processed (is skipped), because the twelfth subframe 1330*d* corresponds to the gaze location and is also associated with a scene change of adding text. To that end, in some implementations, the method 1400 includes identifying the second subframe of the second plurality of subframes by detecting a scene change based on the unwarped image data, and determining that the change corresponds to the portion of the unwarped image data corresponding to the gaze location. The scene change characterizes a difference between a scene at a first time and the scene at a second time, such as before and after entering the text, illustrated in FIGS. 13G and 13H.

As represented by block 1418, in some implementations, processing the warped image data includes encoding at least a portion of the warped image data. For example, the encoding includes encoding the first subframe of the second plurality of subframes, and not encoding the (skipped) second subframe, such as not encoding the twelfth subframe 1330*d* illustrated in FIGS. 13H and 13I. In some implementations, the method 1400 includes encoding the downscaled first portion at a first encoding rate, and encoding the full-scaled second portion at a second encoding rate lower than the first encoding rate. In some implementations, encoding the first portion at the first encoding rate includes encoding the first portion using a first encoding parameter, and encoding the second portion at the second encoding rate includes encoding the second portion using a second encoding parameter. For example, the first and second encoding parameters correspond to different quantization parameters (QPs). An encoder may use a QP to determine how much information to discard. For example, a higher QP indicates more information is to be discarded.

As represented by block 1420, in some implementations, the method 1400 includes transmitting, by the first device, the processed warped image data to the second device. For example, with reference to the description of blocks 1414-1418, the method 1400 includes transmitting the encoded first subframe of the second plurality of subframes to the second device. In some implementations, the method 1400 includes transmitting a first processed subframe of a plurality of subframes, while encoding a second subframe of the plurality of subframes. In other words, the first device may concurrently transmit one subframe while encoding another subframe, to be subsequently transmitted. Being able to divide a frame into subframes increases the efficiency associated with encoding and transmitting by the first device, and also increases the efficiency associated with receiving and decoding by the second device.

Figure 15:
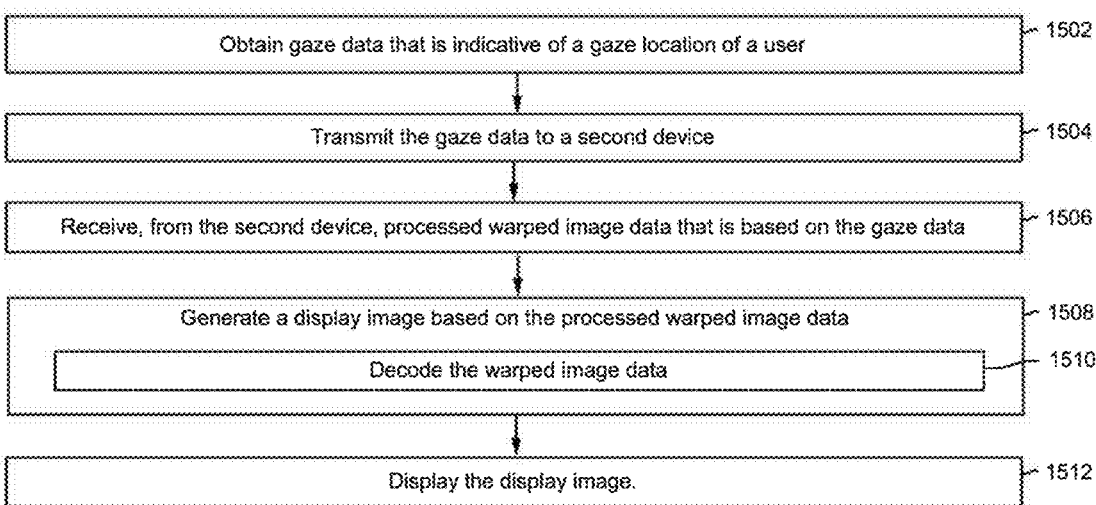
FIG. 15 is a flowchart representation of a method of displaying a display image based on warped image data in accordance with some implementations.

FIG. 15 is a flowchart representation of a method 1500 of displaying a display image based on warped image data in accordance with some implementations. In various implementations, the method 1500 is performed by a first device having a first display, one or more processors, and non-transitory memory (e.g., the electronic device 120 of FIG. 1 or the electronic device 910 of FIG. 9). In some implementations, the method 1500 is performed by processing logic, including hardware, firmware, software, or a combination thereof. In some implementations, the method 1500 is performed by a processor executing instructions (e.g., code) stored in a non-transitory computer-readable medium (e.g., a memory).

As represented by block 1502, the method 1500 includes obtaining gaze data that is indicative of a gaze location of a user. In some implementations, the gaze data includes one or more warp parameters. The gaze location is further described with reference to block 1402.

As represented by block 1504, the method 1500 includes transmitting the gaze data to a second device. For example, with reference to 9A, the electronic device 910 transmits gaze data to the laptop 920. In some implementations, the first device transmits the gaze data while the second displays, on a second display, an unwarped image. For example, with reference to FIG. 9A, the electronic device 910 transmits gaze data to the laptop 920 while the laptop 920 displays an unwarped image on the laptop display 921.

As represented by block 1506, the method 1500 includes receiving, from the second device, processed warped image data that is based on the gaze data. Details regarding generation of the processed warped image data are provided with reference to blocks 1406-1418 of FIG. 14. For example, the processed warped image data includes a first portion corresponding to a downscaled representation of unwarped image data, and the processed warped image data includes a second portion corresponding to a representation of the unwarped image data corresponding to the gaze location. As another example, the processed warped image data is characterized by a plurality of subframes of a frame, such as the first transposed frame 1320 including the second plurality of subframes 1322a-1322d illustrated in FIG. 13F.

In some implementations, the first device receives the plurality of subframes at different times. For example, the method 1500 includes receiving, at a first time, a first subframe of the plurality of subframes, and receiving, at a second time different later than the first time, a second subframe of the plurality of subframes.

As represented by block 1508, the method 1500 includes generating a display image based on the processed warped image data. For example, generating the display image includes unwarping the processed warped image data according to various implementations disclosed herein, to generate the display image. In some implementations and as represented by block 1510, generating the display image includes decoding the processed warped image data. For example, decoding the processed warped image data includes decoding each of the plurality of subframes. In some implementations, the method 1500 includes decoding the first subframe at the second time while receiving the second subframe. In other words, the first device decodes one subframe while receiving another subframe.

In some implementations, the first device decodes the second portion of the processed warped image data, which corresponds to the gaze location, by scaling down the second portion. For example, in some implementations, the method 1500 includes downscaling the second portion to generate a downscaled second portion, and copying the downscaled second portion to a region that corresponds to the gaze location. As one example, with reference to FIG. 13I, the first device performing the method 1500 receives the ninth subframe 1330a, and scales down the ninth subframe 1330a that includes the transposed full-scale representation 1324 of the triangle 1304a and the transposed full-scaled representation 1332 of the text. Continuing with this example, the first device copies the downscaled ninth subframe to a portion of the frame that would otherwise have corresponded to the twelfth subframe 1330d. As described above with reference to FIGS. 13H and 13I, the twelfth subframe 1330d is skipped because its content is duplicated within the ninth subframe 1330a.

As represented by block 1512, the method 1500 includes displaying the display image on the first display of the first device.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a first device having a first display, one or more processors, and non-transitory memory:
obtaining gaze data indicative of a gaze of a user;
transmitting, to a second device having a second display, one or more warp parameters based on the gaze data;
receiving, from the second device, display data based on the one or more warp parameters; and
displaying, on the first display, a display image based on the display data.

2. The method of claim 1, wherein the gaze data indicates a gaze location in a two-dimensional coordinate system of the second device.

3. The method of claim 2, wherein obtaining the gaze data includes determining the gaze location in the two-dimensional coordinate system of the second device based on a gaze location in a three-dimensional coordinate system of a physical environment.

4. The method of claim 2, wherein obtaining the gaze data includes determining the gaze location in the two-dimensional coordinate system of the second device based on a gaze location in a two-dimensional coordinate system of the first device.

5. The method of claim 1, wherein the one or more warp parameters include a gaze location in a two-dimensional coordinate system of the second device.

6. The method of claim 5, wherein the one or more warp parameters further include a gaze location in a second two-dimensional coordinate system of the second device.

7. The method of claim 1, wherein the one or more warp parameters include a maximum resolution.

8. The method of claim 1, wherein the one or more warp parameters include at least one of a fovea size, a falloff parameter, or a minimum resolution.

9. The method of claim 1, wherein the one or more warp parameters are based on a speed constraint.

10. The method of claim 9, wherein the speed constraint is based on a speed of an encoder of the second device.

11. The method of claim 9, wherein the speed constraint is based on a bandwidth of a channel between the second device and the first device.

12. The method of claim 1, further comprising unwarping a warped content image of the display data into an unwarped content image based on the one or more warp parameters.

13. The method of claim 1, further comprising transforming a warped content image of the display data into a transformed warped content image based on the one or more warp parameters and one or more intrinsic warp parameters of the first device.

14. The method of claim 1, wherein transmitting the one or more warp parameters and receiving the display data is performed in response to detecting a user input associating the second device and the first device.

15. The method of claim 1, further comprising:
transmitting, to a third device having a third display, one or more additional warp parameters based on the gaze data; and
receiving, from the third device, additional display data based on the one or more additional warp parameters,
wherein displaying the display image is further based on the additional display data.

16. A first device comprising:
a first display;
non-transitory memory; and
one or more processors to:
obtain gaze data indicative of a gaze of a user;
transmit, to a second device having a second display, one or more warp parameters based on the gaze data;
receive, from the second device, display data based on the one or more warp parameters; and
display, on the first display, a display image based on the display data.

17. The device of claim 16, wherein the one or more warp parameters include a gaze location in a two-dimensional coordinate system of the second device.

18. The device of claim 16, wherein the one or more warp parameters are based on a speed constraint.

19. The device of claim 16, wherein the one or more processors are further to transform a warped content image of the display data into a transformed warped content image based on the one or more warp parameters and one or more intrinsic warp parameters of the first device.

20. A non-transitory memory storing one or more programs, which, when executed by one or more processors of a first device including a first display, cause the first device to:
obtain gaze data indicative of a gaze of a user;
transmit, to a second device having a second display, one or more warp parameters based on the gaze data;
receive, from the second device, display data based on the one or more warp parameters; and
display, on the first display, a display image based on the display data.

* * * * *